(12) United States Patent
Sterling et al.

(10) Patent No.: US 11,512,756 B1
(45) Date of Patent: Nov. 29, 2022

(54) MANUFACTURE METHODS RELATING TO A SUBORDINATE OSCILLATOR ARRAY

(71) Applicants: John A. Sterling, Annandale, VA (US); Joseph F. Vignola, Berwyn Heights, MD (US)

(72) Inventors: John A. Sterling, Annandale, VA (US); Joseph F. Vignola, Berwyn Heights, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/126,709

(22) Filed: Dec. 18, 2020

Related U.S. Application Data

(60) Provisional application No. 62/950,875, filed on Dec. 19, 2019.

(51) Int. Cl.
*F16F 7/10* (2006.01)

(52) U.S. Cl.
CPC ............ *F16F 7/10* (2013.01); *F16F 2222/08* (2013.01); *F16F 2226/04* (2013.01)

(58) Field of Classification Search
CPC ...... F16F 7/10; F16F 2222/08; F16F 2226/04; F16F 7/104; F16F 15/10
USPC .................................... 188/378, 379; 267/41
See application file for complete search history.

(56) References Cited

U.S. PATENT DOCUMENTS

| | | | | |
|---|---|---|---|---|
| 1,675,391 A | | 7/1928 | Stockbridge | |
| 3,314,503 A | * | 4/1967 | Neubert | F16F 15/10 181/207 |
| 4,736,701 A | * | 4/1988 | Kondo | B63B 15/00 114/340 |
| 4,924,976 A | * | 5/1990 | Bernett | B32B 15/06 267/141 |
| 5,431,261 A | | 7/1995 | Olgac | |

(Continued)

OTHER PUBLICATIONS

Joseph F. Vignola, John A. Judge, and Andrew J. Kurdila, "Shaping of a System's Frequency Response Using an Array of Subordinate Oscillators," The Journal of the Acoustical Society of America, 126(1), pp. 129-139 (Jul. 2009).

(Continued)

*Primary Examiner* — Thomas W Irvin
(74) *Attorney, Agent, or Firm* — Howard Kaiser

(57) ABSTRACT

An exemplary inventive subordinate oscillator array (SOA) includes two or more vibration attenuation devices (oscillators) that are sequentially arranged (e.g., via beams in the SOA) so that their respective anti-vibratory influences overlap. To design the SOA, an optimal number N of oscillators is calculated according to the equation $N=\eta Q\Delta$, where $\eta$ is the modal overlap, $Q$ is the quality factor, and $\Delta$ is the desired fractional bandwidth. Each oscillator is akin to a conventional dynamic vibration absorber (DVA) and is characterized by its own mass, stiffness, damping, and geometry (e.g., length, width, and height). The respective characteristics of the oscillators are selected and the oscillators are distributed so that the SOA, when suitably attached to a vibrative structure, attenuates the vibrations of the structure so as to approximately flatten the structure's vibrations over a frequency band of interest.

11 Claims, 18 Drawing Sheets

(56) References Cited

U.S. PATENT DOCUMENTS

| | | | | |
|---|---|---|---|---|
| 6,742,393 | B2* | 6/2004 | Ito | F16F 15/03 |
| | | | | 267/136 |
| 6,954,686 | B2* | 10/2005 | Aubourg | F16F 7/10 |
| | | | | 701/3 |
| 8,342,489 | B1* | 1/2013 | Richardson | F16F 7/116 |
| | | | | 74/551.9 |
| 8,454,449 | B2* | 6/2013 | Ball | F16F 9/306 |
| | | | | 464/180 |
| 8,602,184 | B2* | 12/2013 | Tamura | F16F 15/02 |
| | | | | 188/380 |
| 8,727,079 | B2* | 5/2014 | Sar | F16F 15/04 |
| | | | | 188/266 |
| 9,057,738 | B1 | 6/2015 | Sterling et al. | |
| 9,631,692 | B2* | 4/2017 | Carcaterra | F16F 7/10 |
| 2005/0165515 | A1* | 7/2005 | Aubourg | G05B 5/01 |
| | | | | 244/17.11 |
| 2007/0144841 | A1* | 6/2007 | Chong | H01L 23/49811 |
| | | | | 188/266.7 |
| 2011/0182535 | A1* | 7/2011 | Prieto | F16F 15/10 |
| | | | | 384/97 |
| 2012/0024646 | A1* | 2/2012 | Tsugihashi | F16F 7/015 |
| | | | | 188/268 |
| 2012/0154774 | A1* | 6/2012 | Van Der Wijst | G03F 7/70141 |
| | | | | 355/53 |
| 2014/0008162 | A1* | 1/2014 | Carcaterra | F16F 7/10 |
| | | | | 188/379 |

OTHER PUBLICATIONS

Sai Tej Paruchuri, John Sterling, Vijaya V. N. Sriram Malladi, Andrew Kurdila, Joseph Vignola, and Pablo Tarazaga, "Passive Piezoelectric Subordinate Oscillator Arrays," IOP Publishing, Smart Materials and Structures, vol. 28, 085046, published Jul. 25, 2019.

Joseph Vignola, Aldo Glean, John Judge, and Teresa Ryan, "Optimal Apparent Damping as a Function of the Bandwidth of an Array of Vibration Absorbers," The Journal of the Acoustical Society of America, 134(2), pp. 1067-1070 (Aug. 2013).

Jenna Gietl, Joseph Vignola, John Sterling, Teresa Ryan, "Characterization of Damping Properties in 3D Printed Structures," 13th International Conference on Vibration Measurements by Laser and Noncontact Techniques, Jun. 20-22, 2018, Ancona, Italy, AIVELA 2018, Journal of Physics Conference Series, vol. 1149(1) 012002, published online Dec. 24, 2018.

Sai Tej Paruchuri, "Modeling and Estimation of Linear and Nonlinear Piezoelectric Systems," Dissertation submitted to the Faculty of the Virginia Polytechnic Institute and State University in partial fulfillment of the requirements for the degree of Doctor of Philosophy in Mechanical Engineering, Copyright 2020, Sai Tej Paruchuri, Blacksburg, Virginia, dated Sep. 11, 2020.

John Sterling, Sai Tej Paruchuri,Teresa Jean Ryan, Joseph Vignola, Andrew J. Kurdita, "Subordinate Oscillator Arrays: Physical Design and Effects of Error," Copyright by ASME, Engineering Archive, https://engrxiv.org/preprint/view/924/ published Apr. 13, 2020.

Mohammed Al Rifaie, Hasanain Abdulhadi, and Ahsan Mian, "Advances in Mechanical Metamaterials for Vibration Isolation: A Review," Advances in Mechanical Engineering 2022, vol. 14(3) 1-20, accepted Feb. 7, 2022.

John Sterling, Sai Tej Paruchuri, Pablo Tarazaga, Joseph Vignola, Andrew Kurdila, Vijaya V. N. Sriram Malladi, and Teresa Ryan, "Piezoelectric Subordinate Oscillator Arrays: Performance Recovery and Robustness to Uncertainty," Copyright 2019 by ASME, ASME Digital Collection, published online Nov. 25, 2019.

Aldo A. Glean, Joseph F. Vignola, John A. Judge, and Teresa J. Ryan, "Impact of Mass Ratio and Bandwidth on Apparent Damping of a Harmonic Oscillator with Subordinate Oscillator Array," Proceedings of Meetings on Acoustics, vol. 19, 065068 (2013), published Jun. 2, 2013 by the Acoustical Society of America through the American Institute of Physics.

Joseph F. Vignola and John Judge, "Rapid Step Response with Limited Ringing and Light Damping," 159th Meeting Acoustical Society of America/NOISE-CON 2010, Baltimore, Maryland, Apr. 19-23, 2010, Proceedings of Meetings on Acoustics, vol. 9, 065009 (2010), published Dec. 15, 2010 by the Acoustical Society of America through the American Institute of Physics.

John A. Judge, Douglas M. Photiadis, Joseph F. Vignola, Brian H. Houston, and Jacek Jarzynski, "Attachment Loss of Micromechanical and Nanomechanical Resonators in the Limits of Thick and Thin Support Structures," Journal of Applied Physics 101, 013521, Jan. 2007.

John Sterling, Joseph Vignola, Jenna Gietl, Teresa Ryan, Noah Sonne, and Sai Tej Paruchuri, "Effect of Increased Damping in Subordinate Oscillator Arrays," slide presentation, 235 pages, 13th International Conference on Vibration Measurements by Laser and Noncontact Techniques, Jun. 20-22, 2018, Ancona, Italy, AIVELA 2018.

U.S. Appl. No. 62/950,875, filed Dec. 19, 2019, entitled "Design and Manufacture Methods Relating to a Subordinate Oscillator Array," inventors John A. Sterling et al., Navy case No. 103,926.

John A. Sterling, "Novel construction Tecnniques for Arrays of Dynamic Vibration Absorbers: Modelling and Experimentation," Dissertation submitted to the Faculty of the Department of Mechanical Engineering of The Catholic University of America in partial fulfillment of the requirements for the Degree Doctor of Philosophy, © 2020 all rights reserved by John A. Sterling, Washington, D.C., available in the digital collections of the university libraries of the Catholic University of America, dissertations from the School of Engineering, 126 pages.

John Sterling, Joseph Vignola, Jenna Gietl, Teresa Ryan, Noah Sonne, and Sai Tej Paruchuri, "Effect of Increased Damping in Subordinate Oscillator Arrays," 13th International Conference on Vibration Measurements by Laser and Noncontact Techniques, Jun. 20-22, 2018, Ancona, Italy, AIVELA 2018, Journal of Physics Conference Series, vol. 1149(1) 012006, published online Dec. 24, 2018.

Sai Tej Paruchuri, John Sterling, Andrew Kurdila, and Joseph Vignola, "Piezoelectric Composite Subordinate Oscillator Arrays and Frequency Response Shaping for Passive Vibration Attenuation," 2017 IEEE Conference on Control Technology and Applications (CCTA), Aug. 27-30, 2017, Kohala Coast, Hawaii.

M. Strasberg and D. Feit, "Vibration Damping of Large Structures Induced by Attached Small Resonant Structures," The Journal of the Acoustical Society of America, 99 (1), pp. 335-344 (Jan. 1996).

* cited by examiner

MANUFACTURE METHODS RELATING TO A SUBORDINATE OSCILLATOR ARRAY

CROSS-REFERENCE TO RELATED APPLICATIONS

This patent application claims the benefit of U.S. provisional patent application No. 62/950,875, filed 19 Dec. 2019, hereby incorporated herein by reference, entitled "Design and Manufacture Methods Relating to a Subordinate Oscillator Array," inventors John A. Sterling et al.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to vibration attenuation of structures, more particularly to methods, apparatuses, and systems for effecting vibration absorption of a structure (e.g., machine) using a subordinate oscillator array.

A typical "subordinate oscillator array" ("SOA") includes a series of beams whose isolated natural frequencies form a certain frequency band throughout which the vibration of a master structure is attenuated. Previous approaches to effecting vibration absorption using a subordinate oscillator array were based on mathematics and general design procedures, but gave little or no consideration to some significant aspects and details. What is needed is a better methodology for providing a subordinate oscillator array for attachment to a master structure in order to attenuate vibration of the master structure over a frequency range of interest.

SUMMARY OF THE INVENTION

In view of the foregoing, an object of the present invention is to provide a better methodology for attenuating vibrations of a master structure (synonymously referred to herein as a "host structure" or "host") by coupling therewith a "subordinate oscillator array" (acronymously referred to herein as an "SOA").

Another object of the present invention is to provide a better methodology for improving the attenuation of vibrations of a master structure by a subordinate oscillator array that is coupled therewith.

The present invention is based in part on the proposition that a judicious choice of the distribution of masses and stiffnesses of the attached oscillators can result in a relatively flat frequency response of the host structure over a desired band. This "flat-band response" is a new and important feature of the present invention and represents a significant improvement over classical dynamic vibration absorbers (DVAs) that attenuate a structure's response at one target frequency while increasing the frequency response amplitude at nearby side frequencies. Performance of the SOA can be highly sensitive to the uncertainty or disorder in the mechanical properties of the system.

As exemplarily embodied, the present invention represents a novel design strategy that can make use of either 3D-printing or piezoelectric SOAs (PSOAs). These inventive strategies have the potential to address and ameliorate such sensitivity to error. It is important to note that the present invention's design strategy is simple and effective in that it can be carried out without computational optimization techniques by choosing simple or well-known distributions of properties.

Exemplary practice of the present invention provides a method for the design and manufacture of a multiple tuned mass damper vibration absorber. The present invention, as exemplarily embodied, precisely defines the number of oscillators required, and/or their properties, and/or whether the results from the calculation are actually achievable in a given manufacturing system. Exemplary inventive practice considers the shape of the frequency response of the combined system, which is often of utmost importance.

The present invention represents a robust design methodology using deterministic relationships. An exemplary inventive device results in the same level of increased damping in the temporal domain, but offers flat-band responses to resonances. According to exemplary inventive embodiments, this response shape can be changed to many other shapes as desired, using the present invention's design parameters. Furthermore, exemplary inventive practice provides an algorithm to precisely define the length, width, and thickness of beams required to create an array of oscillators, rather than just a general theoretical outline.

According to some embodiments of the present invention, an inventive method is provided for mitigation of the effects of disorder in a host-SOA system. An exemplary inventive embodiment of a mitigative method takes into consideration the fact that a system is extremely sensitive to any kind of error in the distributions of properties of each element in the array. If the isolated natural frequency of each individual oscillator is off by even 1%, the entire effect may be compromised. Undesirable artifacts begin to appear at approximately 0.1% error. The sources of this error include but are not limited to: manufacturing tolerances; dependence of material stiffness with respect to temperature, fatigue, and corrosion.

According to exemplary inventive practice, this undesirable effect can be mitigated in a three-fold strategy, combining three procedures (sub-strategies or strategical components) as described hereinbelow. Depending on the inventive embodiment, inventive practice may provide for implementation of one or two or all three of the strategical components. The implementation of one, two, or all three of these strategical components represents a comprehensive method to mitigate the hypersensitivity of the SOA system to errors in the distributions of which it is comprised. The three inventive strategical components of an inventive method of disorder mitigation can be combined in any permutation and, as a combination, represent a comprehensive disorder mitigation strategy.

According to a first strategical component of an inventive disorder mitigation method, in some cases the sizes of SOA dimensions can be varied somewhat using an inventive SOA design method. However, generally speaking, the total mass is constrained by that same design methodology, making this strategical component of limited application.

According to a second strategical component of an inventive disorder mitigation method, using a material of increased damping levels will reduce the magnitude of the filter effect on an ideal system, but will also reduce the sensitivity of the system to disorder. This may be achieved by using 3D-printed materials instead of standard metals. With the reduced density of a plastic compared to a metal and the mass constraint mentioned above, this can cause very large SOAs and may also not be applicable to every case.

According to a third strategical component of an inventive disorder mitigation method, it is possible to bond a piezoelectric bimorph to individual SOA elements, and to use a capacitive circuit to modify the stiffness of the beam post-manufacture. Piezoelectrically-bonded SOAs are the most complex solution but also the most broadly applicable. There is sufficient tuning authority present in the correctly selected piezoelectric bimorph to return SOAs that are disordered due to environmental effects back to an ordered state.

According to an exemplary inventive method for attenuating vibration of a structure, an inventive practitioner configures a subordinate oscillator array having a plurality of oscillator elements, and attaches the subordinate oscillator array to a host structure so that the attached subordinate oscillator array effects a vibratory attenuation of the host structure. The configuring of the subordinate oscillator array includes: designating a number of oscillator elements; attributing each oscillator element with an element mass, an element stiffness, an element geometry, and an element quality factor; and distributing the oscillator elements in the subordinate oscillator array. The vibratory attenuation is characterized by an at least substantially flat vibratory frequency across a selected vibratory frequency band of the host structure.

By way of example, a practitioner of the present invention effects a geometric physical design of a mechanical system that unites a host structure (e.g., a machine) and a vibrationally attenuative structure (i.e., an SOA). The inventive practitioner determines (e.g., selects, measures, or calculates) two key characteristics of the host structure, viz., (i) the mass or weight of the host structure, and (ii) the frequency band to be suppressed in the host structure. The required number of oscillators in the SOA is determined, using the relationship $N=\eta Q\Delta$. The "center length" is determined, based on the center frequency and the frequency distribution parameter, $\beta$. The center length and the frequency distribution are translated into the length distribution. The mass ratio is determined from the required bandwidth. The mass distribution is formed from the mass ratio and the linear distribution $\alpha^*$ parameter. The volume relationship is used to determine the width distribution. The thickness is iterated to adjust the length distribution and the width distribution to ensure manufacturability.

The present invention is disclosed by the present inventor in his doctoral dissertation, hereby incorporated herein by reference, as follows: John A. Sterling, "Novel Construction Techniques for Arrays of Dynamic Vibration Absorbers: Modelling and Experimentation," Dissertation submitted to the Faculty of the Department of Mechanical Engineering School of Engineering of The Catholic University of America in partial fulfillment of the requirements for the Degree Doctor of Philosophy, © 2020 all rights reserved by John A. Sterling, Washington, D.C., available in the digital collections of the university libraries of the Catholic University of America, dissertations from the School of Engineering.

Pertinent to the instant disclosure are the following papers, each of which is hereby incorporated herein by reference: John Sterling, Joseph Vignola, Jenna Gietl, Teresa Ryan, Noah Sonne, and Sai Tej Paruchuri, "Effect of Increased Damping in Subordinate Oscillator Arrays," 13th International Conference on Vibration Measurements by Laser and Noncontact Techniques, 20-22 Jun. 2018, Ancona, Italy, AIVELA 2018, Journal of Physics Conference Series, Volume 1149(1) 012006, published online 24 Dec. 2018; Sai Tej Paruchuri, John Sterling, Vijaaya V. N. Sriram Malladi, Andrew Kurdila, Joseph Vignola, and Pablo Tarazaga, "Passive Piezoelectric subordinate Oscillator Arrays," IOP Publishing, *Smart Mater. Struct.*, Volume 28 (2019) 085046, published 25 Jul. 2019; M. Strasberg and D. Feit, "Vibration Damping of Large Structures Induced by Attached Small Resonant Structures," The Journal of the Acoustical Society of America, 99:335 (1996); Joseph F. Vignola, John A. Judge, and Andrew J. Kurdila, "Shaping of a System's Frequency Response Using an Array of Subordinate Oscillators," The Journal of the Acoustical Society of America, 126(1):129-139 (July 2009); Sai Tej Paruchuri, John Sterling, Vijaya V. N. Sriram Malladi, Andrew Kurdila, Joseph Vignola, and Pablo Tarazaga, "Passive Piezoelectric Subordinate Oscillator Arrays," Smart Materials and Structures, 28(8):085046 (July 2019); Joseph Vignola, Aldo Glean, John Judge, and Teresa Ryan, "Optimal Apparent Damping As a Function of the Bandwidth of an Array of Vibration Absorbers," The Journal of the Acoustical Society of America, 134(2):1067-1070 (August 2013); Joseph F Vignola, John A Judge, and Andrew J Kurdila, "Shaping of a System's Frequency Response Using an Array of Subordinate Oscillators," The Journal of the Acoustical Society of America, 126(1):129-139 (July 2009); Sai Tej Paruchuri, John Sterling, Andrew Kurdila, and Joseph Vignola, "Piezoelectric Composite Subordinate Oscillator Arrays and Frequency Response Shaping for Passive Vibration Attenuation," 2017 IEEE Conference on Control Technology and Applications (CCTA), Aug. 27-30, 2017. Kohala Coast, Hi.

Also pertinent to the instant disclosure and incorporated herein by reference is Antonio Carcaterra et al., U.S. Pat. No. 9,631,692 B2, issued 25 Apr. 2017, entitled "Vibration Damping Device."

BRIEF DESCRIPTION OF THE DRAWINGS

The present invention will now be described, by way of example, with reference to the accompanying drawings, wherein:

As shown in FIG. 1, N subordinate elements are attached to the primary element. Each element has a distinct mass $m_n$, stiffness $k_n$, and damping $c_n$.

DESCRIPTION OF EXEMPLARY
EMBODIMENTS OF THE INVENTION

Figure 1:
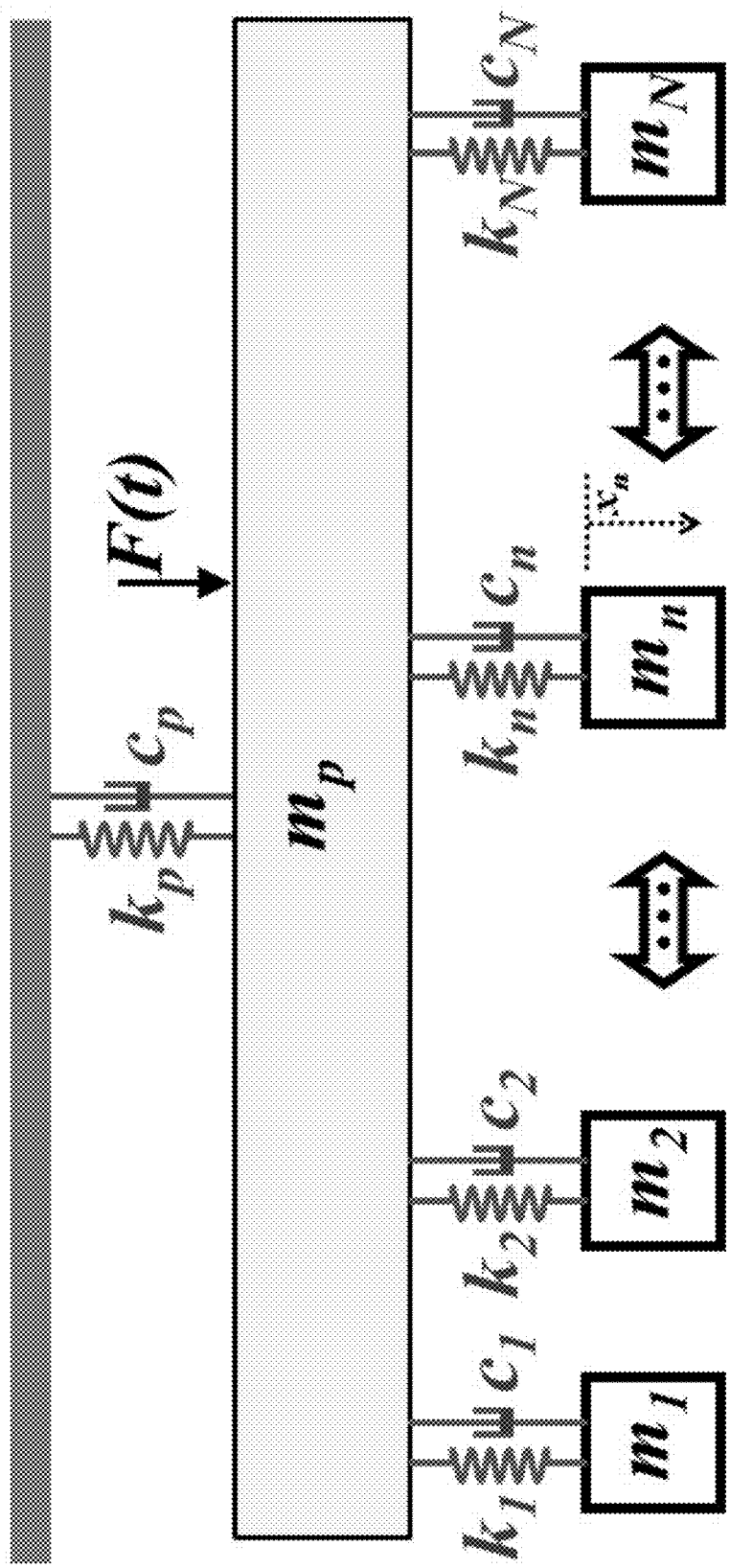
FIG. 1 is a diagram of an example of an N+1 degree of freedom model of a mechanical system.

Referring now to FIG. 1, a set of relevant parameters is defined by the present invention as contextualized in a representative SOA-host model. As shown in FIG. 1, a collection of oscillators is described in a system of parameters having values that are inventively determined.

According to exemplary practice of the present invention, Eq. 1 governs the minimum required number of oscillators to have sufficient modal coverage given a specified band and damping level:

$$N = \eta Q \Delta \quad (1)$$

where N is the minimum number of oscillators, η is the modal overlap, Q is the Quality Factor of the isolated oscillator elements, and Δ is the desired fractional bandwidth.

Table 1, below, lists the parameters and other variables used in an exemplary inventive embodiment. All of the parameters are used to shape the frequency response function over a target frequency range. The fractional bandwidth is defined as the bandwidth of the effect as a fraction of the center frequency of the range to be modified. Modal overlap is a measure of modal density of the SOA. Modal overlap is a unitless value calculated on an individual element basis by the half-power bandwidth divided by the frequency span between the fundamental frequency of the current oscillator to that of the next.

TABLE 1

| | |
|---|---|
| Number of Oscillators | N |
| Quality Factor | Q |
| Element Quality Factor | $Q_n$ |
| Modal Overlap Parameter | η |
| Fractional Bandwidth | Δ |
| Mass Distribution | α |
| Mass Ratio | μ |
| Mass | $m_n$ |
| Stiffness | $k_n$ |
| Center Frequency | $F_C$ |
| Frequency Distribution | β |
| Frequency Distribution Parameter | p |
| Frequency Difference (Successive Frequencies) | Δf |
| Material Stiffness | E |
| Material Thickness | t |
| Material Density | ρ |
| Beam Length | L |

Table 1 includes all of the theoretical parameters required for physical design of an SOA in accordance with exemplary practice of the present invention. According to exemplary inventive practice, a computer is implemented for performing computations pertaining to some or all of the parameters. The Element Quality Factor, $Q_n$, is defined to characterize the physical damping in each element. Exemplary inventive practice assumes that $Q=Q_n$ for each individual oscillator. This assumption is made because the oscillator elements are each made of the same material and will have similar, simple geometries. It is important to note that this $Q_n$ is not observable in the combined response of the system. The system is full of resonances that will not be seen in the primary response. In order to observe and individual resonance, the individual elements would need to be removed from the system individually and excited on their own.

There are several additional factors that affect the design of an SOA in accordance with the present invention. System properties of the host system or primary oscillator and material properties of the SOA to be designed must be analyzed. There are two main relevant considerations for system design, viz., (i) the mass of the primary system, and (ii) the bandwidth and center frequency of the band to be suppressed. The relevant material properties are the Quality Factor, Young's modulus, and density. Also, if there are anticipated environmental changes, such as temperature variation, additional care must be taken to make sure the SOA will perform as expected throughout the temperature range. Each of the parameters that define a design space can be used to alter the designed performance of the system.

Important aspects of exemplary inventive practice include: the effects of Δ, the fractional bandwidth; the effects of damping in the SOA system; the effects of the mass distribution, α, and mass ratio, μ; the generation of the frequency distribution, β, using the frequency distribution parameter, p; several manufacturing constraints. It is important to note that the y-axis is normalized by the primary stiffness and has values of $$\frac{Xk_{Pri}}{F}$$

According to an exemplary inventive SOA model, the subordinate oscillator array is designed to produce precisely such a flat-band response. In contrast to the classical DVA, which removes energy from a single frequency, the inventive SOA removes energy over a target frequency band. FIG. 1 shows a representation of the SOA with N subordinate elements modeled as spring-mass dampers. Each element, including the primary, has an isolated natural frequency of $\omega_n = k_n/m_n$. The system is designed such that the range of natural frequencies of the subordinate oscillators define a band with the frequency of the primary mass, $\omega_p$, at or near the center, with distributions of $k_n$ and $m_n$ that result in a flat frequency response across the band.

The distributions of element properties are organized non-dimensionally as ratios of the primary mass or frequency. The mass ratio distribution is denoted $\alpha$ and the mass ratio of each individual subordinate oscillator is denoted $\sigma_n$. The set $\beta$ represents the distribution of individual frequency ratios of the primary center frequency. The individual isolated natural frequency ratios are denoted by $\beta_n$. The range of these ratios is dictated by the fractional bandwidth, L. In this relationship, $\beta_n$ is defined as $\beta_n = \omega_n/\omega_p$, and $\Delta$ is defined as $\Delta = (\omega_n - \omega_1)/\omega_p$. By way of example, the non-dimensional frequency response of a basic SOA system may have a 25% bandwidth, so $\beta$ would contain values from 0.875 to 1.125.

Figure 2:
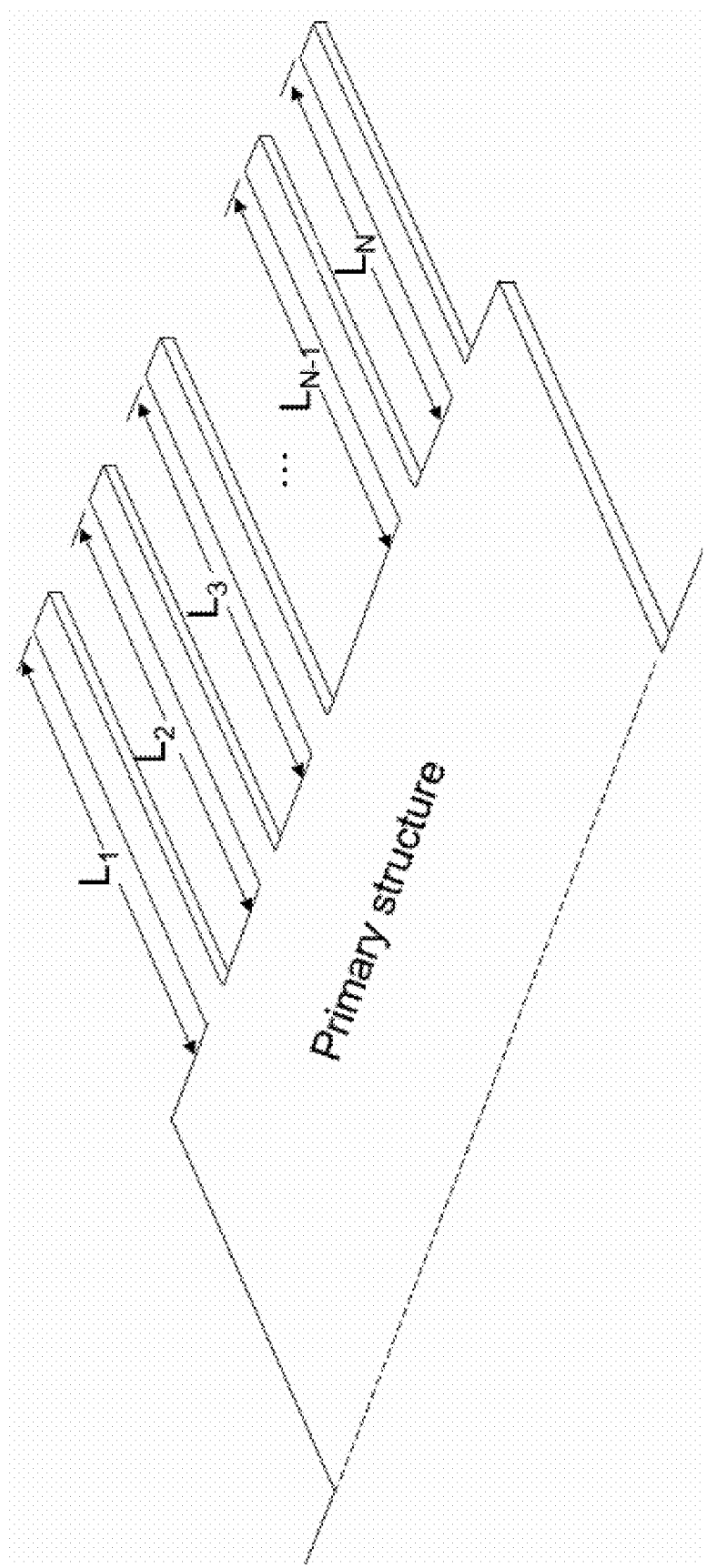
FIG. 2 is a diagram of an example of the physical layout used to realize the system model shown in FIG. 1.

The pure SOA is inventively defined by a set of property distributions that can be applied to any physical second order system, such as electrical, acoustic, or mechanical. Discussed hereinbelow are the inventive steps for the design of a physical SOA. An exemplary representation of a physical implementation of the inventive model is shown in FIG. 2. An exemplary inventive design of an SOA specifies the number of oscillators and their length, width, and height. Also discussed herein are mechanical SOAs and the addition of piezoelectric components to a mechanical geometry.

Figure 3:
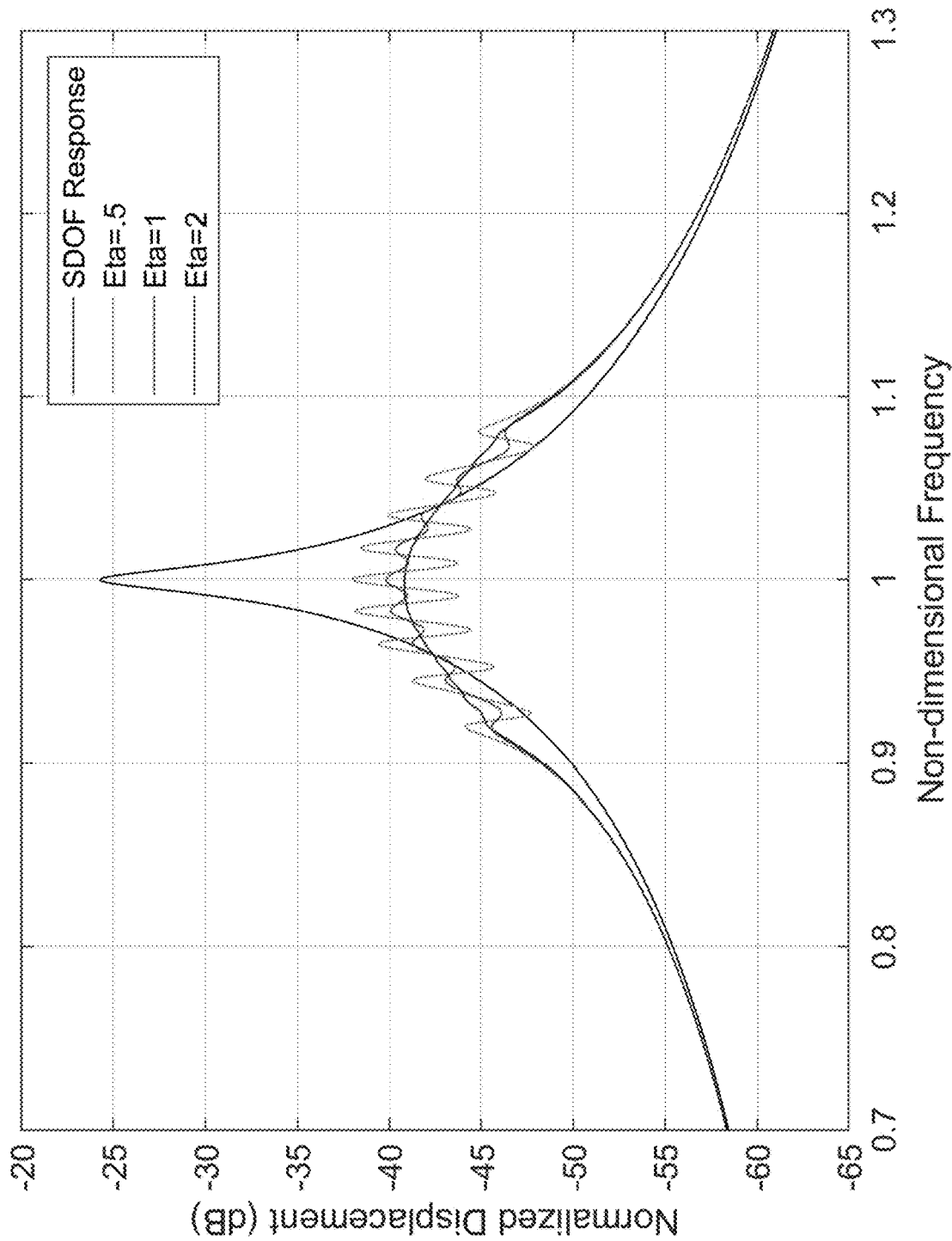
FIG. 3 is graphical representation showing, by way of example, the effects of $\eta$ on the SOA system response. The ripple effect starts small but ramps up as $\eta$ is decreased.

Modal overlap, $\eta$, is defined as the half-power bandwidth of an individual SOA element divided by the difference in frequency of successive element natural frequencies, $\Delta f$. For the system as a whole, modal overlap can be calculated as where $Q_{SOA}$ is the Quality Factor of each isolated element natural frequency, and the frequency separation between adjacent resonances is given by $\Delta/(N-1)$. Modal overlap, $\eta$, is generally set to 2 when calculating the required number of oscillators. Any value below two means that there is not enough modal density to properly create the desired effect. The effect shows up as ripple in the combined response and is visible for the $\eta=1$ case as shown in FIG. 3. Raising $\eta$ above 2 has little effect in this example but is revisited hereinbelow.

Figure 4:
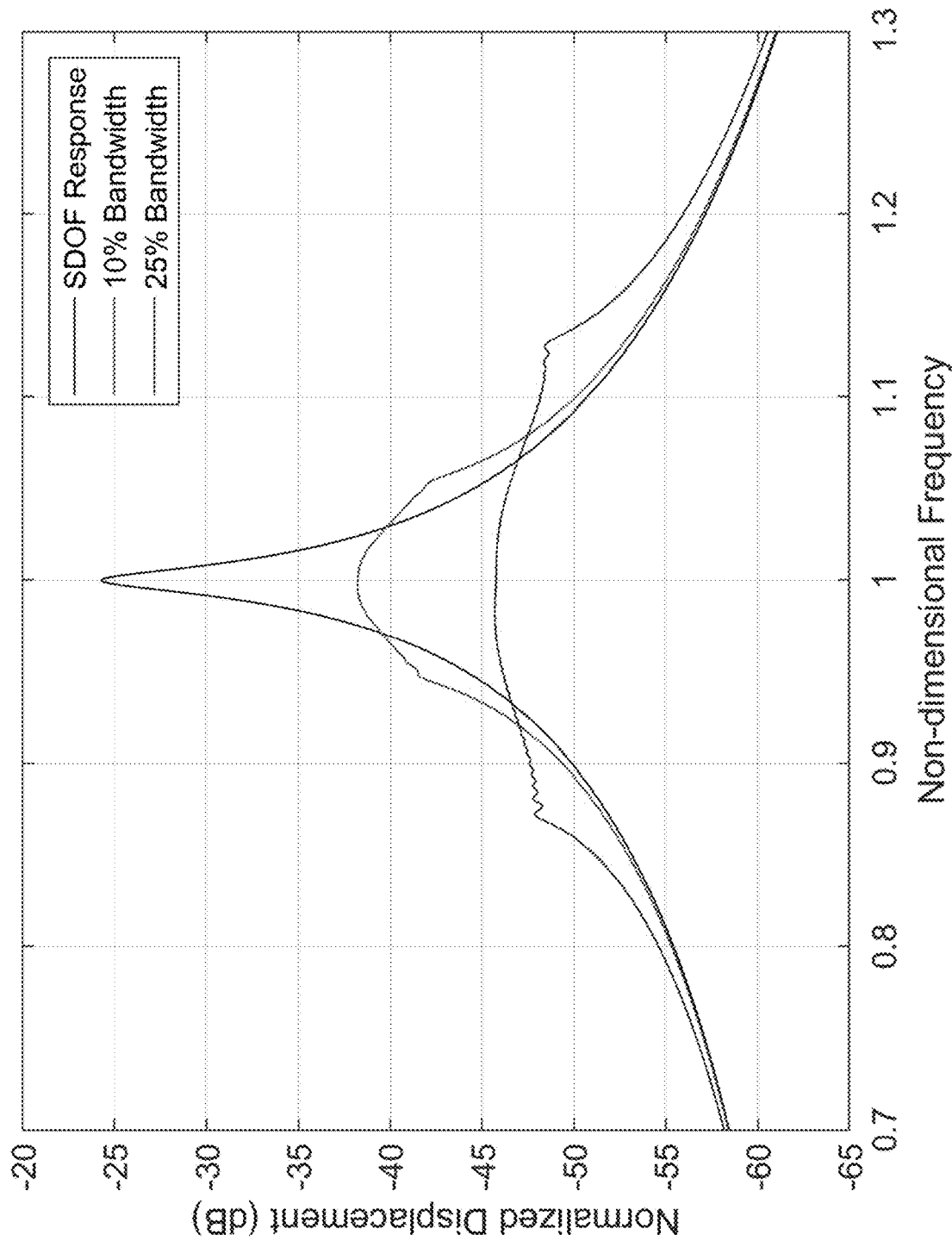
FIG. 4 is a graphical representation showing, by way of example, 10% bandwidth and 25% bandwidth. The SOA effect begins at one-half the nominal bandwidth.

An inventive SOA is designed to suppress a band of frequencies over a bandwidth measured as a fraction of the center frequency. The center frequency, $F_C$, and the fractional bandwidth, $\Delta$, are preferably chosen ahead of time in order to inventively design an SOA. The required width of the fractional bandwidth is dependent on the nature of the peak to be suppressed. For example, a fractional bandwidth of 10% would suppress magnitudes between 95% and 105% of the center frequency. The SOA is effective at suppressing peaks of both high and low quality factor, but the fractional bandwidth needs to contain the entire peak to be suppressed. An example of the fractional bandwidth is shown in FIG. 4. Based on FIG. 4, it may be tempting to increase the fractional bandwidth artificially to increase the total suppression level. This essentially involves adding more oscillators (increased N) to increase the overall suppression. However, this can lead to additional design or manufacturing issues that could make the SOA impossible to manufacture.

Figure 5:
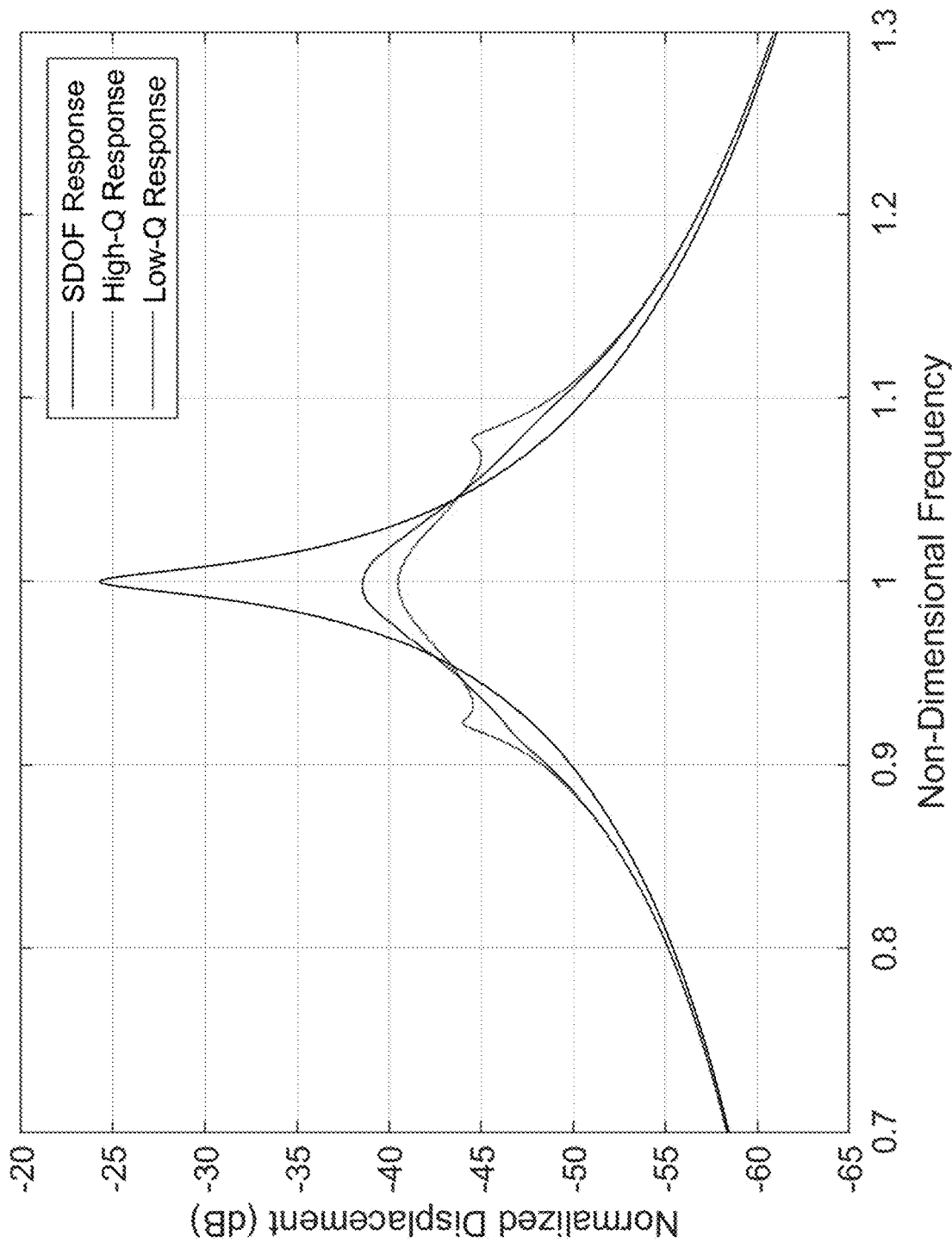
FIG. 5 is a graphical representation showing, by way of example, an example of the effect of choosing fractional bandwidth, A, that is too large. Note that the low-Q response does not express the edge artifacts but also achieves less peak suppression. Both curves display the response of a host system with a 25% fractional bandwidth SOA.

Exemplarily, when considering Eq. (1) with respect to inventive SOA design, modal overlap, $\eta$, is set to two, and fractional bandwidth, $\Delta$, is the frequency range to be suppressed. With these two values (modal overlap and fractional bandwidth) constrained, the Quality Factor, Q, remains as the only material property involved in determination of the number of oscillators, N, required for the SOA. Higher Quality Factor will marginally increase the peak suppression but also increase the number of oscillators required. Using a high-Q material in the SOA also requires strict attention to the fractional bandwidth that is chosen. As shown in FIG. 5, if the fractional bandwidth is too large, then the high-Q the response will have artifacts at the edges of the band, whereas a low-Q SOA is less sensitive to this effect.

With the number of oscillators required in the array, N, determined in Eq. 1, the mass distribution, $\alpha$, can then be defined. The required total mass of the SOA elements is expressed as the sum of the elements of the mass distribution, $\alpha_n$. For the flat-band configuration, the optimal mass ratio, $\mu$, between the total mass of the SOA and the host structure has been determined to be $\mu = \Delta^2/4$. This requirement dictates that more mass will be required to suppress a wider bandwidth.

Figure 6:
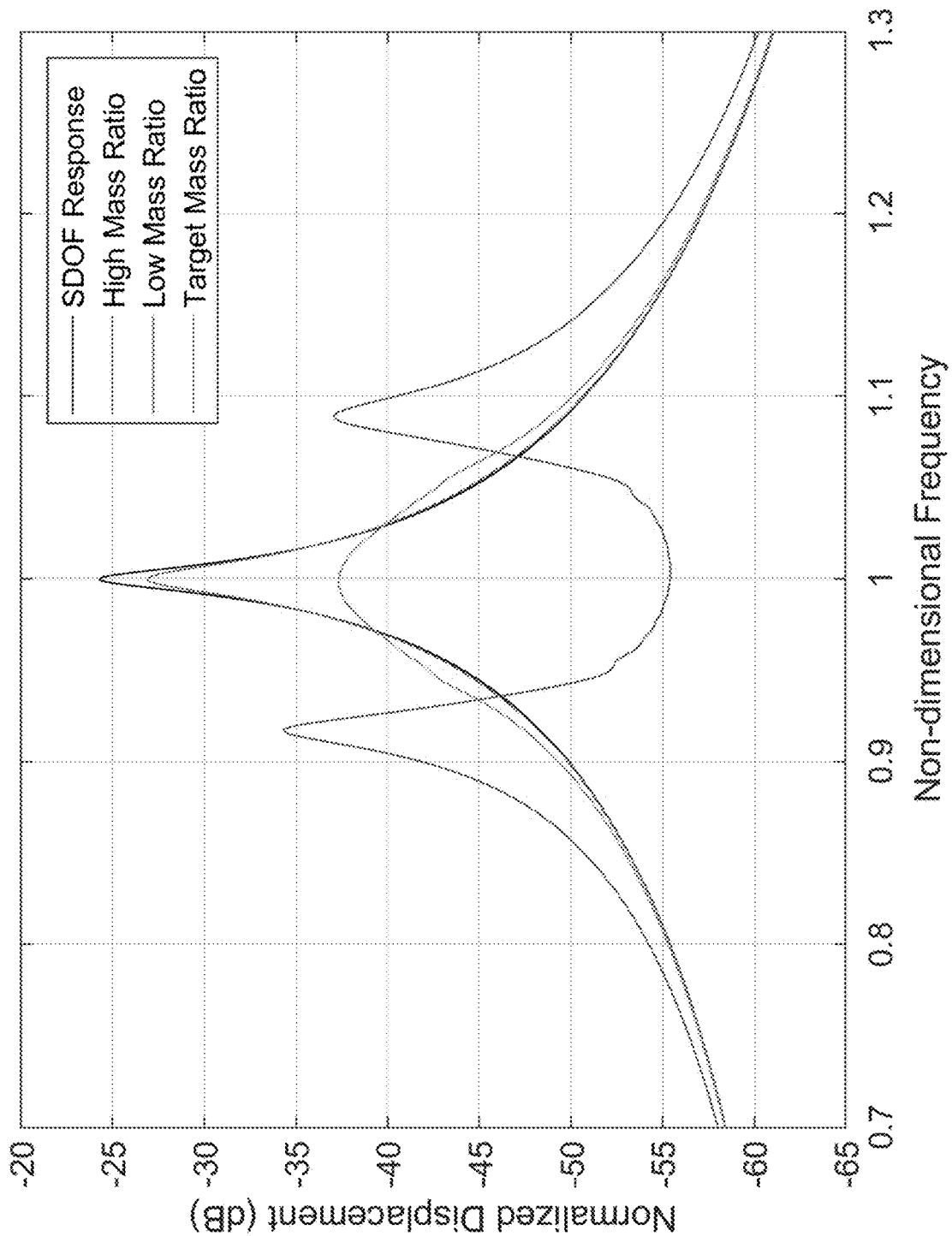
FIG. 6 is a graphical representation showing, by way of example, the effects of mass ratio on the SOA adorned system. The high mass ratio returns the performance to that of a classical dynamic vibration absorber (DVA). The low mass ratio is less effective at modifying the response of the primary system.

For the example presented in FIG. 6, a desired response maximizes the peak reduction while minimizing side artifacts. This high mass ratio will create resonant peaks of its own to the sides of the primary peak. These peaks can offset the benefits of the initial peak reduction. This behavior essentially returns the performance profile of the system to that of a classical DVA. In contrast, decreasing the mass ratio too far reduces the amount of energy transferrable into the SOA system, reducing the suppression capabilities of the system. This effect is because a reduced mass represents a reduced energy capacity of the SOA system.

Many of the properties of an inventive SOA design are defined in terms of a discrete distribution of a particular property over the set of oscillators. The discrete distribution of frequencies across the fractional bandwidth, $\Delta$, is represented by the set $\beta$. Equation (2), below, defines the frequency distribution, $\beta$, for the $n^{th}$ oscillator in terms of the number of oscillators, N, the fractional bandwidth, $\Delta$, and the frequency distribution parameter, p. As presented, Eq. (2) generates a $\beta$ that has a non-dimensional center frequency of 1. The actual frequency distribution is created by multiplying the set $\beta$ by the center frequency of the host structure. The $\beta$ distribution represents the target or "as-designed" isolated natural frequencies of each of the individual oscillators that comprise the SOA.

$$\beta_n = \begin{cases} \frac{\Delta}{2}\left(\left(\frac{2(n-1)}{N-1}\right)^p - 1\right) + 1 & \text{for } n \leq \frac{N}{2} \\ \frac{\Delta}{2}\left(1 - \left(\frac{2(n-1)}{N-1}\right)^p\right) + 1 & \text{for } n > \frac{N}{2} \end{cases} \quad (2)$$

Figure 7:
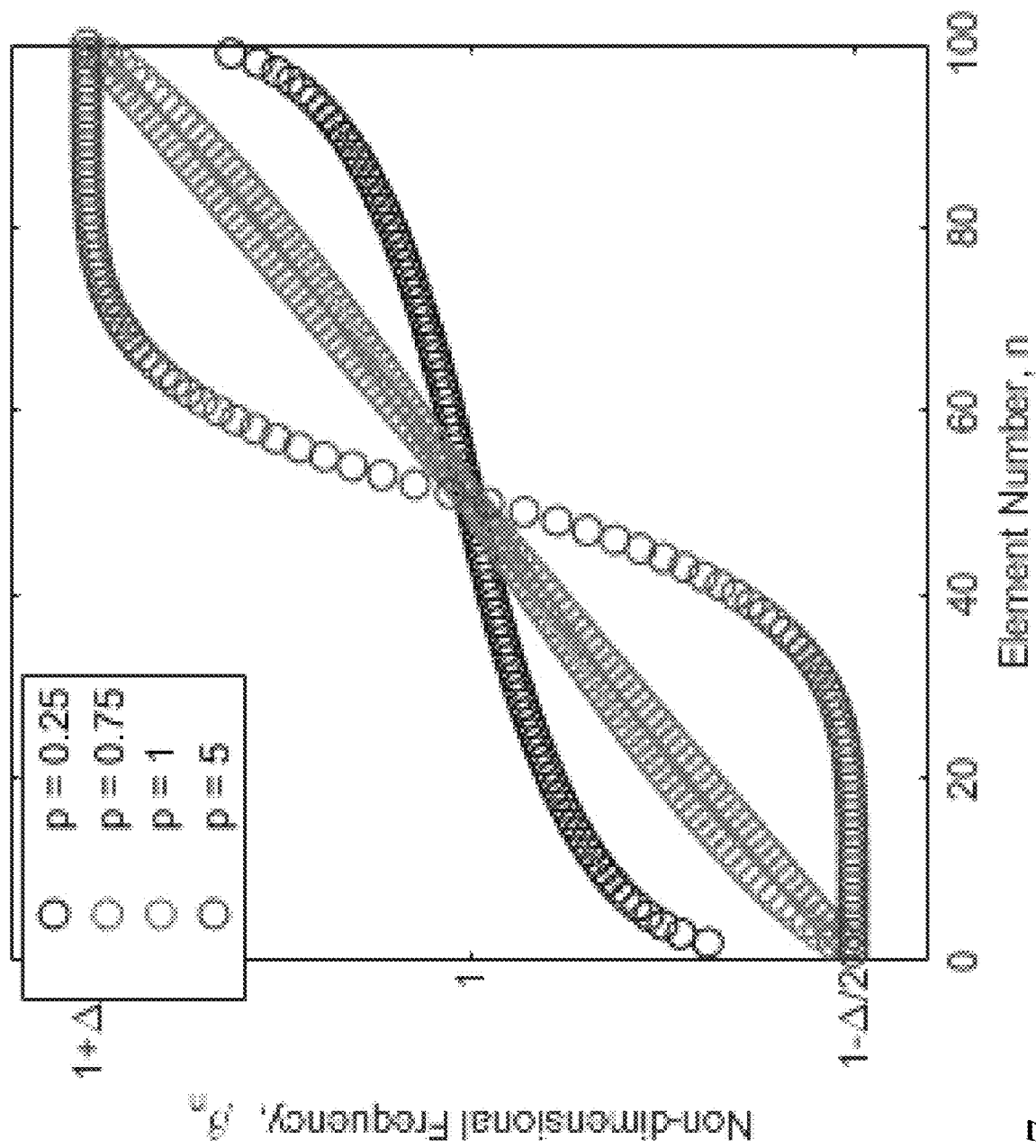
FIG. 7 is a graphical representation showing, by way of example, how the p value affects the density of the frequency distribution about the center frequency. A p value of 1 provides a linear distribution of frequency throughout the distribution.
Figure 8:
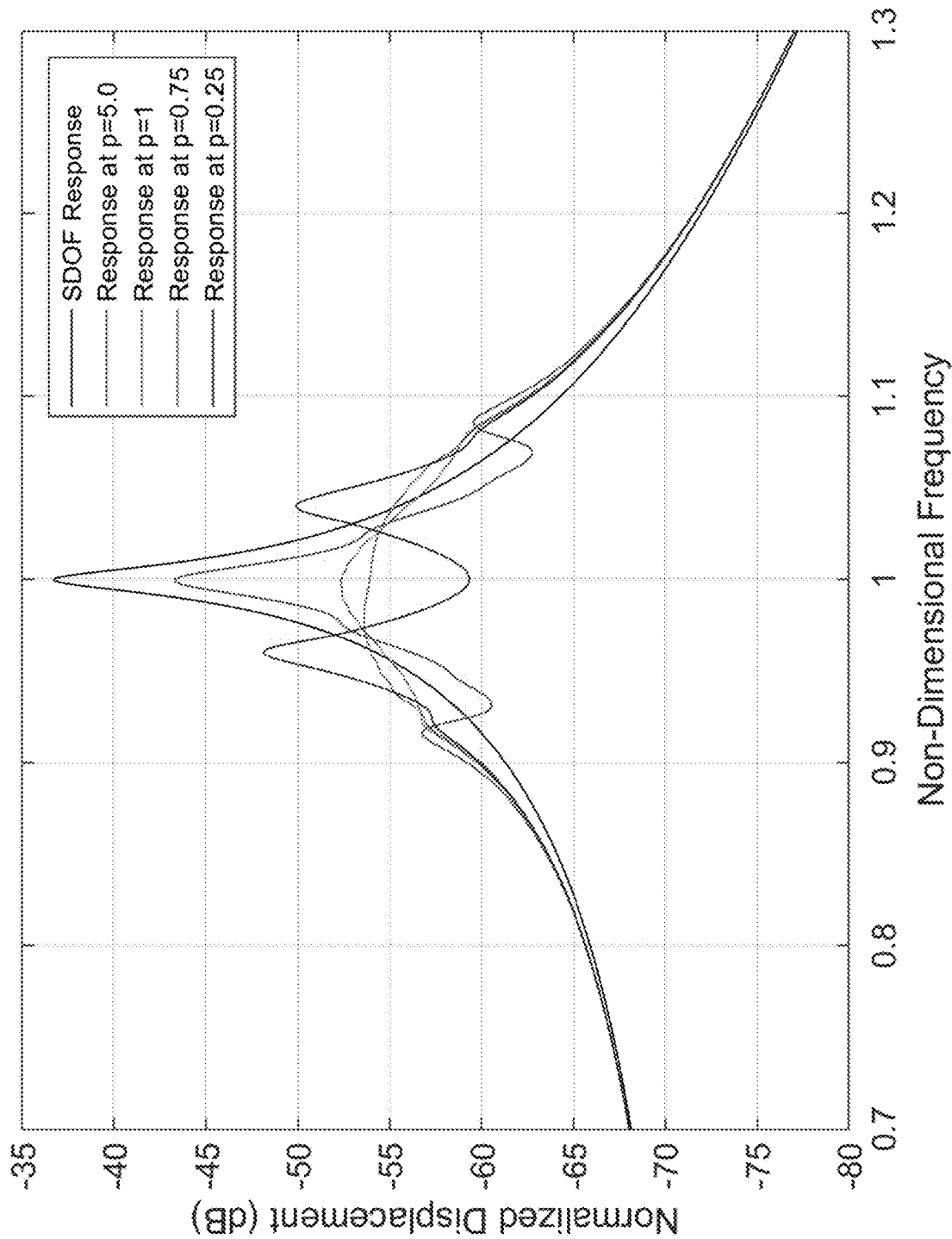
FIG. 8 is a graphical representation showing, by way of example, how the p value affects the density of the frequency distribution about the center frequency. A p-value of 1 will return a balanced curve with equal weights of frequency distribution throughout the target band. A p-value of 0.75 will offer more of a flat-band effect as it has more elements of the frequency distribution closer to the center frequency.

FIG. 7 shows the effect of distribution parameter p on the frequency distribution β, and FIG. 8 shows the effect of p on the actual SOA response. Note that p>1 packs more oscillator frequencies toward the edges of the SOA target band. Therefore, the SOA would be less effective on the at modifying the response at the host structure's center frequency, diminishing the performance of the SOA as a whole for an SDOF system. Levels of p from 1 to approximately 0.75 produce a flat response near the center of the target band, generally best suited for an SDOF host structure. As p approaches 0.6 and below, a dimple will form in the flat response. Decreasing p below 0.25 causes the SOA system response to become essentially equivalent to that of a classical DVA with an equivalent mass that is simply the total SOA mass.

Successful design of an SOA must consider the practical (e.g., manufacturing) constraints on the ranges of each of the aforementioned physical parameters. There are two categories of constraints in the present invention's SOA design methodology. Geometric constraints involve ensuring that certain design assumptions are held true. For example, this formulation relies on beam aspect ratios that satisfy Euler-Bernoulli conditions. Material constraints will differ between materials and chosen manufacturing processes, but must be considered thoroughly during SOA design. As another example, steel will have a much smaller practical minimum thickness than 3D-printed materials. As another example, steel has been successfully used at a thickness of 0.01 inches, while the recommended minimum thickness for ABS, a common 3D-printed polymer, is nearly 5 times greater at 0.047 inches (1.2 mm). Typical constraints to consider are: minimum and maximum length, minimum width, maximum width, minimum thickness, thickness-to-length ratio, and width-to-length ratio. The values of these constraints are not absolute and, especially for 3D-printed materials, must be determined independently for each design situation.

There are various properties of classical disorder. One of the most important aspects in the inventive design of a subordinate oscillator array is the sensitivity of performance to error in the distributions of mass and frequency. Although the inventive design of the SOA distributions is exact, the implementation is not and there are several sources of disorder. These include, but are not limited to: manufacturing tolerances, corrosion, fatigue, and imprecise knowledge of boundary conditions. The end result is that even though the initial design may perform well, life cycle and environmental factors must be considered. In the literature, the precision of the α and β distributions has thus far needed to be greater than 99 percent to achieve good results. Error on the order of 1 part in 1000 is detectable, and 1 in 100 has a significant effect on the results.

Figure 9:
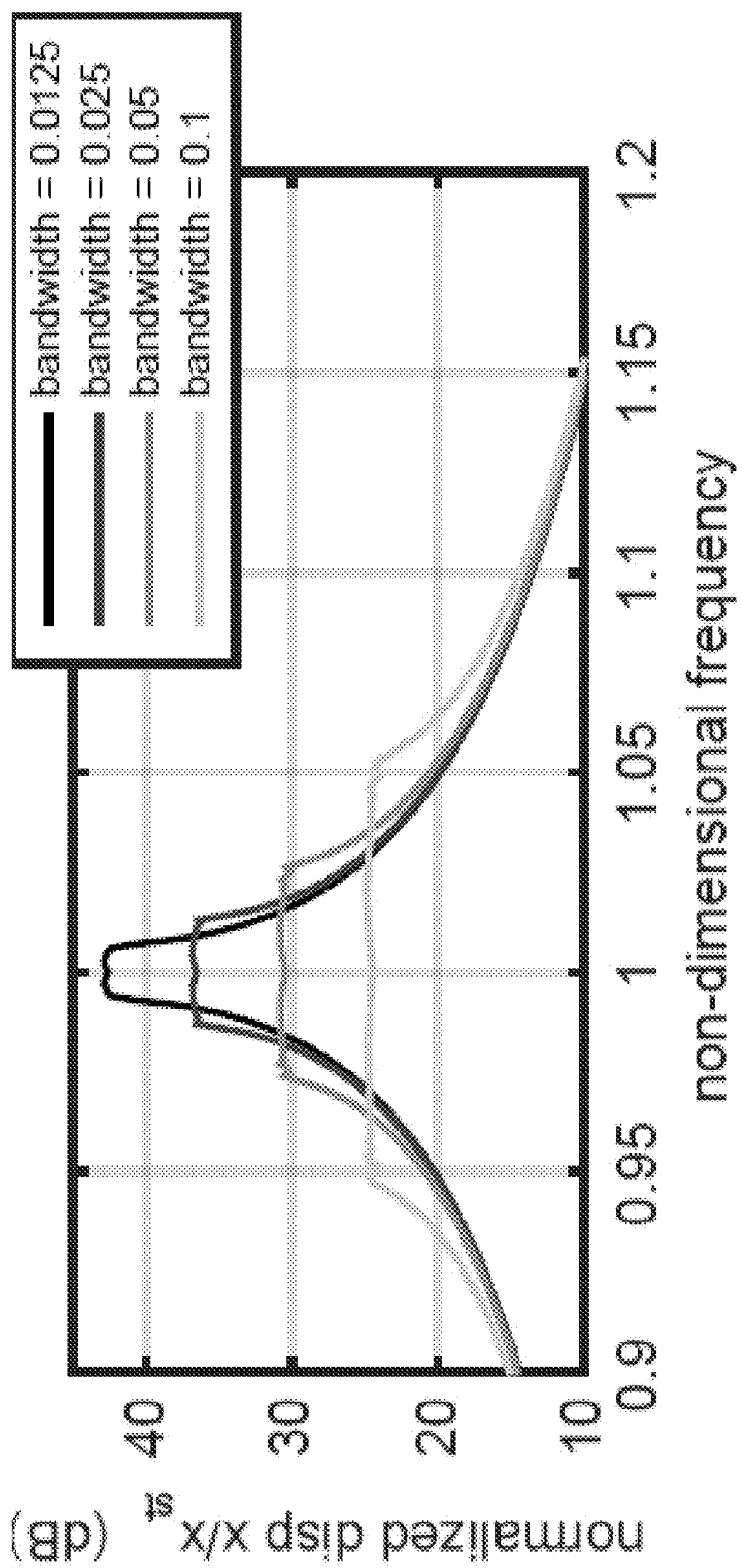
FIG. 9 is a graphical representation showing, by way of example, how an array of attachments can be designed to make the response of the primary element behave as a flat-band. This curve is generated with 0 disorder to show optimized performance.
Figure 10:
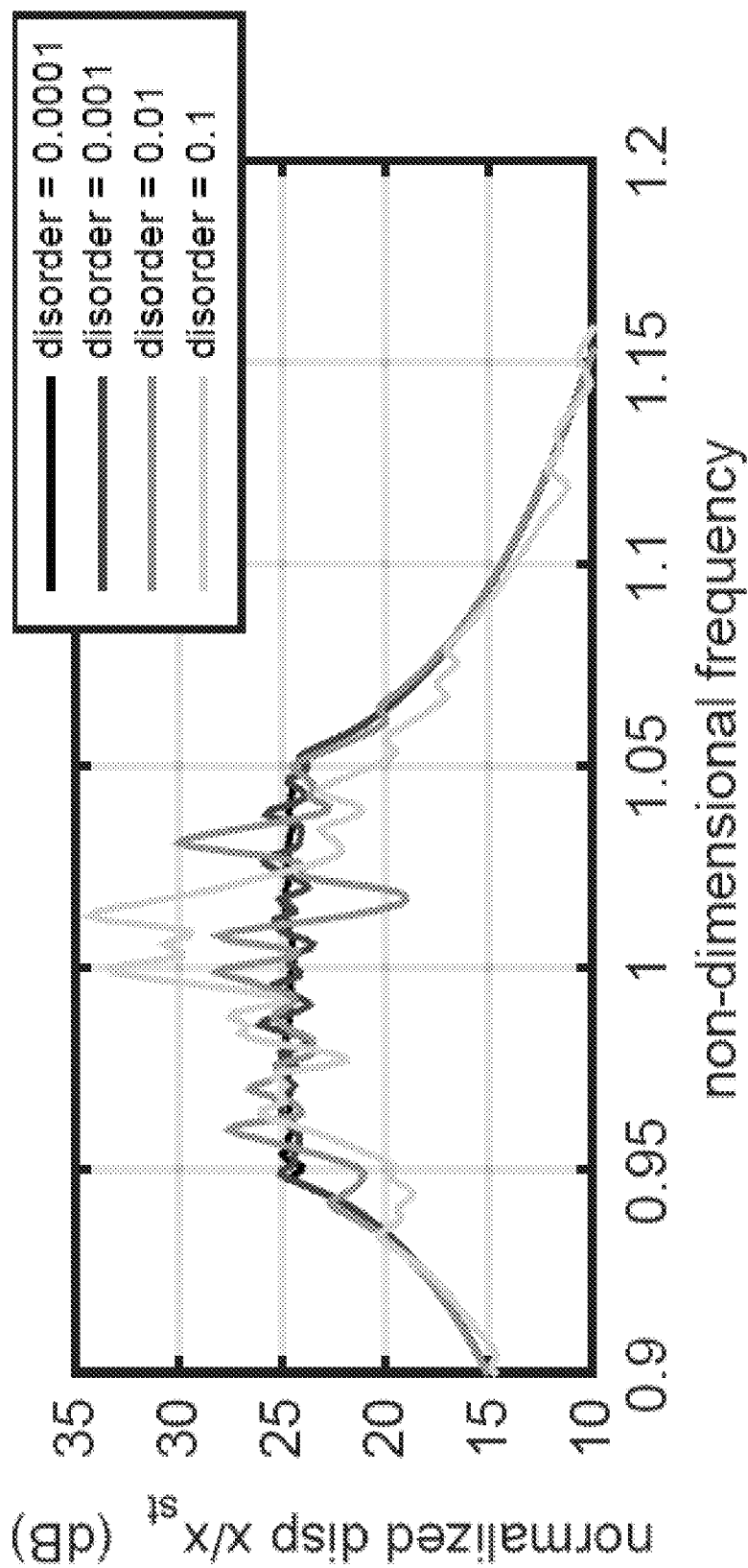
FIG. 10 is a graphical representation showing, by way of example, how a flat-band response may be designed to have a 10% bandwidth. However, the performance degrades as error in the property distribution increases from one part in $10^4$ where the flat-band performance is unaffected to 10%, where the flat-band response is not apparent.

As a general example of the basic properties of an SOA-attached system, FIG. 9 shows the desired response of an SOA-attached system at different bandwidths. These curves contain no disorder and therefore none of the effects of disorder are visible. FIG. 10 includes four different distributions of the masses, $m_n$, and stiffnesses, $k_n$, and constant low damping. In FIG. 10, disorder is randomly introduced into the β distribution and the results are plotted. Disorder is introduced in a statistical manner according to $$\beta_d(n)=\beta_0(n)+d\epsilon(n), \tag{3}$$

where $\beta_d(n)$ is the disordered β distribution, $\beta_0$ is the original, 0-disorder distribution, d is the disorder level, and $\epsilon(n)$ is the Gaussian random distribution with a standard deviation of 1.

Although this potentially produces values for $\beta_d$ that are negative, setting a maximum disorder such that d<0.25 sets the chance of this at less than 0.01%. Systems with disorder at or above this level will perform so poorly that analysis of the system is unimportant. As the disorder multiplier is reduced to levels that are relevant to SOA system analysis, this chance becomes vanishingly small. In the rare case that a negative $\beta_n$ does occur, the sign is simply flipped. FIG. 10 also illustrates this progressively increasing effect of fabrication error on the flat-band response. These results are computed with a $Q_{SOA}$ of 100 and represent the initial findings on the effects of disorder.

Figure 11:
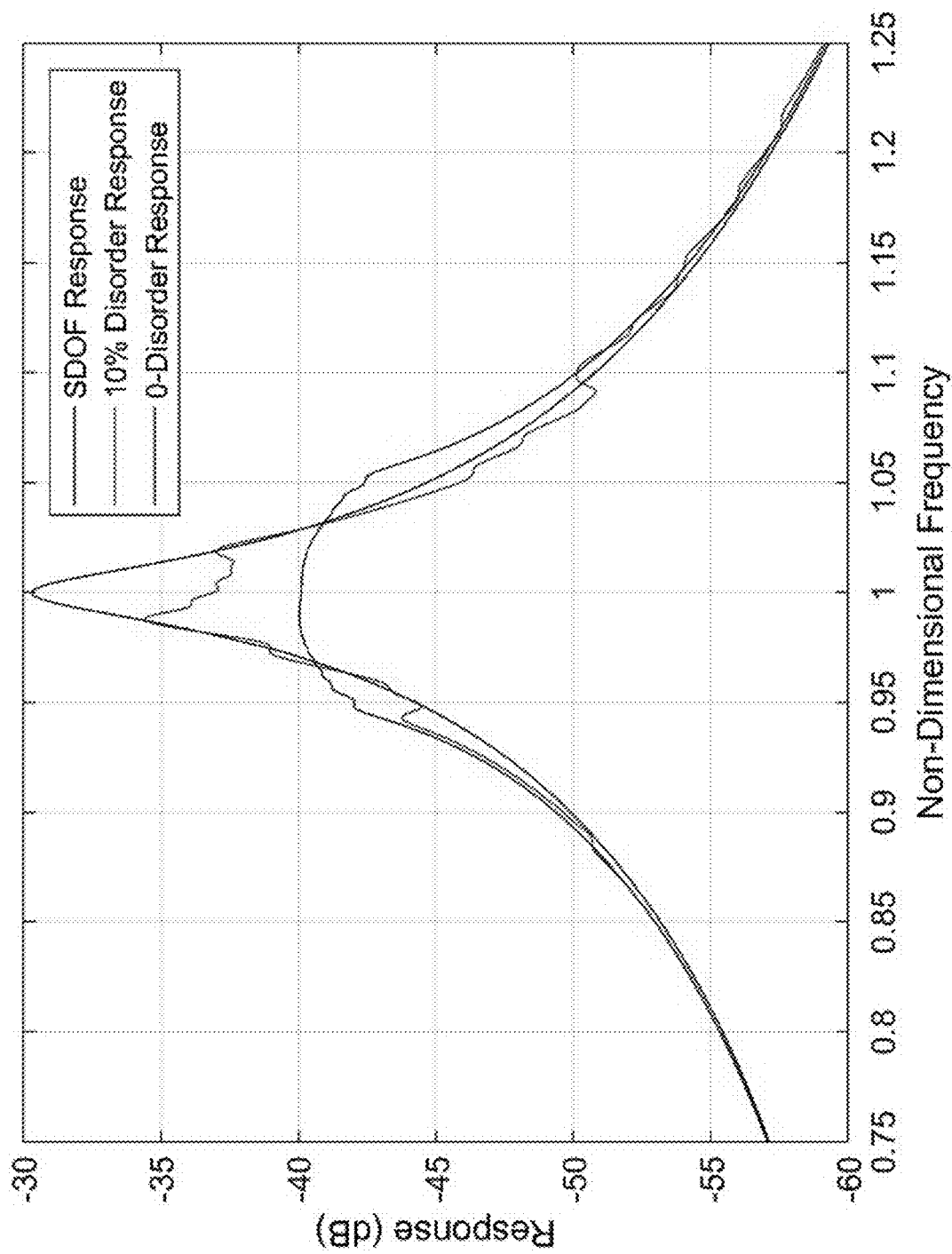
FIG. 11 is a graphical representation showing, by way of example, how the difference between the 0-disorder and disordered curves form the basis for the set used to calculate $M_{RMS}$ and $M_{MDIB}$.

There are at least two methods for assessing performance metrics, and each of these may be applied to different situations. Each method captures different aspects of the performance as a whole. FIG. 11 shows the basic SDOF response of the primary system. Also shown is an ideal, zero-disorder response as well as a response with a randomized d=0.1 disorder.

As stated in Eq. (3), the disordered curve is generated by simulating the response of a system with distributions defined by adding a random value drawn from a Gaussian distribution to each element in the β distribution. Although there are a discrete number of oscillators, the response of the SOA system is continuous. This continuous response can be calculated at any arbitrary point to provide better resolution for the metric than simply N data points. The difference between the two curves, zero-disorder and disordered curves, in FIG. 11 at some number of frequency points that is much greater than N is calculated. This calculation is shown in Eq. (4):

$$G_M(\Omega_j)=G_0(\Omega_j)-G_d(\Omega_j) \tag{4}$$

where $G_M$ is the set of difference between the 0-disorder $G_0$ and the disordered curve $G_d$ and j marks the individual sample in the frequency domain. With $G_M$ defined, a metric can be calculated for this individual pair of FRFs.

The root-mean-square of the set has been labeled the RMS metric and is calculated as shown in Eq. (5).

$$\hat{M}_{rms} = \left(\frac{1}{J}\sum_{j=1}^{J}|G_M(\Omega_j)|^2\right)^{1/2} \tag{5}$$

The greatest absolute value in this set has been labelled the Maximum-Difference-In-Band (MDIB) metric. This is determined in Eq. (6) as $$\hat{M}_{MDIB} = \mathop{MAX}_{j=0 \to J}(|G_M(\Omega_j)|) \tag{6}$$

While the RMS will never be greater than the MDIB, these could be used in different scenarios. The RMS is used to display the overall performance of the system in overall vibration reduction across the entire band. This metric is useful in a general overall analysis and specifically for a fatigue life or overall damping analysis regime. The $M_{MDIB}$ metric would be employed if the system was sensitive to any vibration levels in the band, such as in a detection regime. As described in the following three paragraphs, there are essentially three situations that compare the two methods.

First, a single high-Q oscillator out of order in an otherwise ordered system would show a low RMS metric, but this artifact would be detected by the MDIB method.

Second, a series of moderately disordered oscillators where none is a significant outlier would show similar results between the two methods. This is the most common situation and is expected under normal manufacturing situations. The MDIB method would obviously show slightly higher levels but the relative response to disorder trends remains identical.

Third, a system whose response has low disorder but translated on the frequency axis is considered. This case would occur when an SOA was applied to a resonance, but then the resonance moves slightly. Because a single large difference would affect the entire metric, the MDIB metric would consider this a poor system, as there would be a significant difference at the edges of the target band. The RMS method would average out the edge artifacts and give a low overall error level due to the fact that the vast majority of in-band levels would match.

When measuring the performance of an SOA, it is usually important to consider both metrics for each individual application of the SOA system. One must define an acceptable performance profile in order to determine whether $M_{MDIB}$ or $M_{RMS}$ is appropriate. This metric creates a single number that represents the performance of the SOA across the frequency band. However, it is subject to the effects of a random distribution and, as such, a single value of M does not lead to any insights on its own. It may be possible to perform simulations to gain such insight.

Various SOA parameters influence the metrics. In order to handle effects of random distributions, a Monte Carlo simulation is run until results converge. The disordered curve $G_d$ is regenerated at each particular value and compared to the reference curve, and a new $\hat{M}$ is calculated. Within 250 cycles, a clear solution is evident. By 2500 cycles, results have converged. This converged value is displayed on the plots as $M_{RMS}$ or $M_{MDIB}$. The following analysis shows the effect of multiple levels of modal overlap and quality factor over a range of disorder values. The $M_{RMS}$ and $M_{MDIB}$ will both be shown to illustrate different points. In most cases, $M_{RMS}$ and $M_{MDIB}$ follow the same trends but with different scaling factors.

Figure 12:
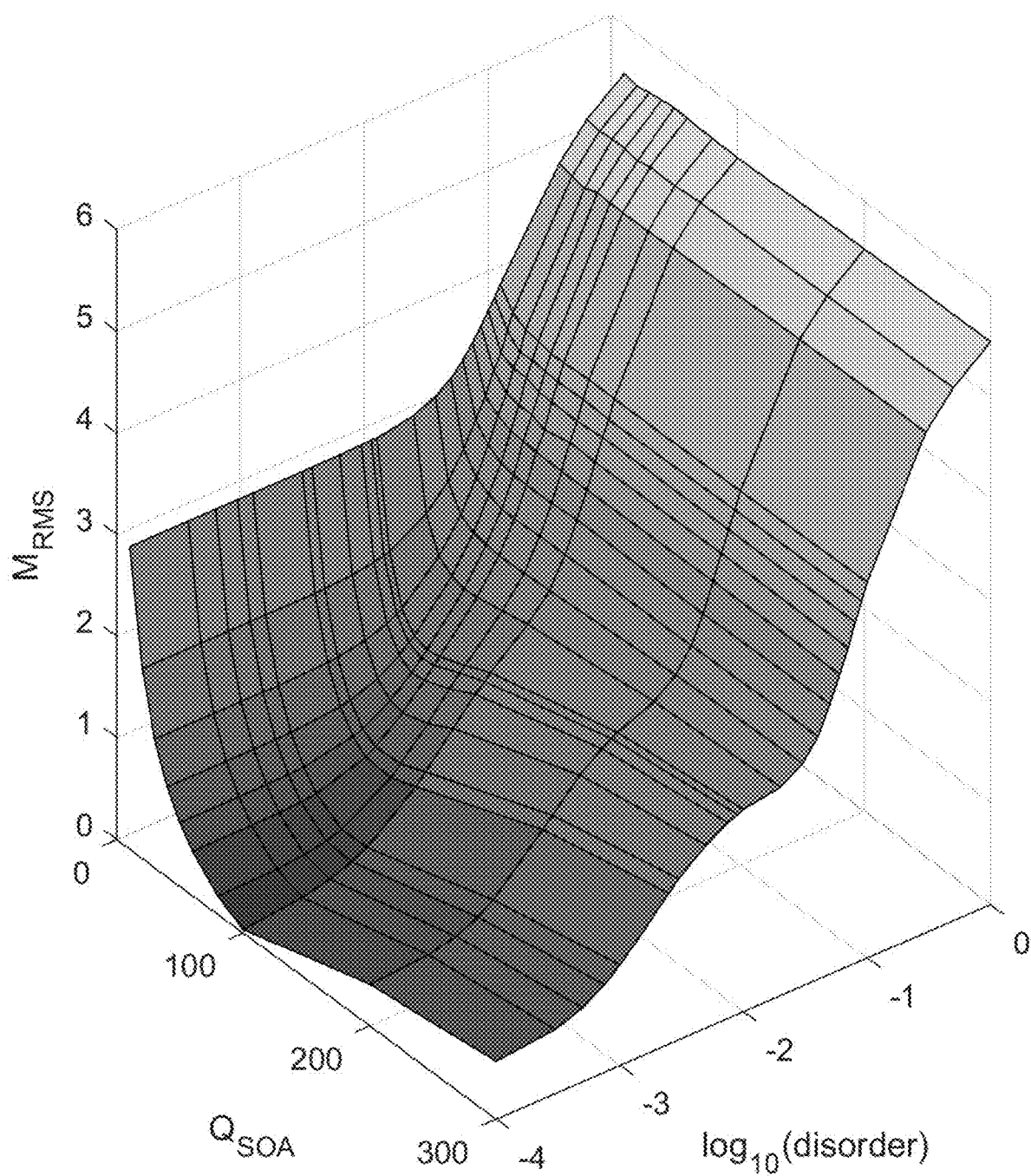
FIG. 12 is a graphical representation (surface plot) showing, by way of example, the $M_{MDIB}$ response to changing damping and disorder.

There are 23 disorder levels simulated, ranging from $10^{-4}$ to 0.25. For each modal overlap and damping level, the metric is generated at the given disorder level. FIG. 12 shows a surface to the relationship between the multiple variables. For the upcoming figures in this chapter, three disorder zones are defined to facilitate analysis: low-disorder ($d<10^{-3}$); disorder-transition ($10^{-3} \leq d < 10^{-1}$); and disorder-dominant ($d \geq 10^{-1}$).

In the low-disorder zone, M levels are based on design issues. At low Q, the SOA does not have the physical capability to recreate the target response. This difference is seen as a ridge on the left side of the surface in FIG. 12. This falls off quickly and low M levels are seen at all other levels of damping in this disorder zone. This zone represents the minimum M level achievable for an SOA design.

As disorder continues above $10^{-3}$, $M_{RMS}$ begins to increase, more rapidly with higher Q. This represents the behavior expected in the disorder transition region. By d of $10^{-2}$, the sensitivity of the high-Q SOA configuration is evident. At disorder levels of $10^{-1}$ and above, M increases rapidly as the disorder-dominant zone is entered. FIGS. 13 through 17 are illustrative of this behavior in a more in-depth manner.

Figure 13:
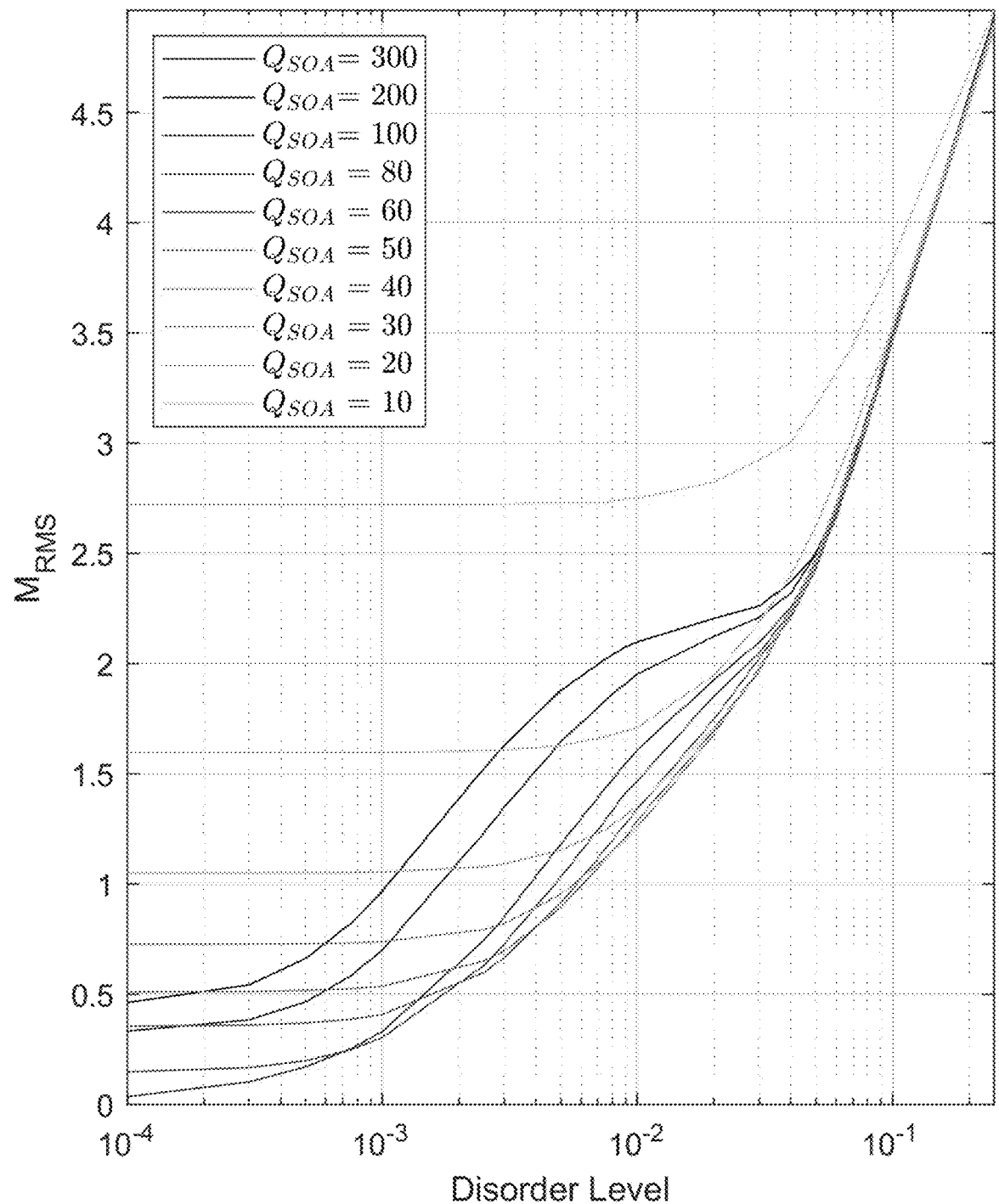
FIG. 13 is a graphical representation showing graphs of $M_{RMS}$ with increasing disorder of several values of $Q_{SOA}$ with $Q_{pri}$ set to 100.

FIG. 13 depicts slices of FIG. 12 and shows the effects of increasing disorder while varying damping. Note that from FIG. 11, the 0%-disorder reference curve is generated with an arbitrary level of damping, which, in this work, was chosen to be a Q of 100. At any Q level that is not the target Q, there will be an inherent difference between the two. However, the magnitude of these differences decreases exponentially as $Q_{SOA}$ increases. This decrease in magnitude is due to the fact that as Q becomes arbitrarily large, it is converging to the perfectly flat-band.

Two characteristics are visible in FIG. 13 that mirror the discussion from FIG. 12. If $Q_{SOA}$ is too low, there is a large inherent difference between the disordered curve and the reference curve. If $Q_{SOA}$ is too large, $M_{RMS}$ begins to increase quickly as disorder increases. This effect is due to the innate sensitivity of high-Q oscillators to disorder. There is a competing effect between having large enough Q to correctly form the desired response and a low enough Q to temper the effects of disorder. Also, as with FIG. 12, once the disorder-dominant zone is entered, $M_{RMS}$ begins to grow quickly as expected.

Note that there is a particular Q, termed $\hat{Q}$, below which the $M_{RMS}$ curve is only concave up. When $Q<\hat{Q}$, the static $M_{RMS}$ caused by the inability to precisely recreate the reference response increases. Conversely, $Q>\hat{Q}$ increases the system's disorder sensitivity in the transition region. For example, in FIG. 13, $\hat{Q}$ is approximately 50. Numerical simulation indicates that $\hat{Q}$ depends on the primary structure's damping and is generally less than the Quality Factor of the primary structure.

Figure 14:
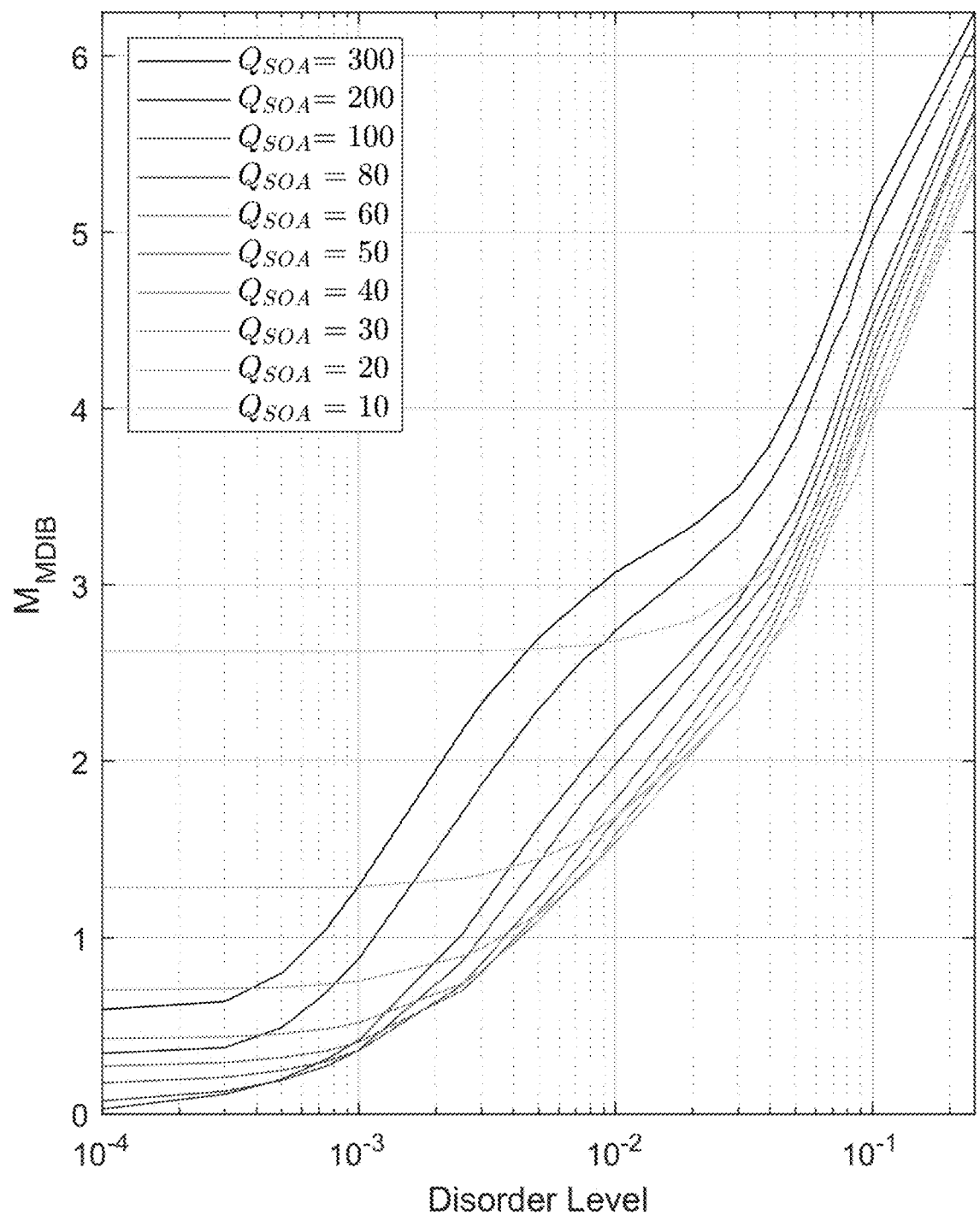
FIG. 14 is a graphical representation showing $M_{MDIB}$ of several values of $Q_{SOA}$ with $Q_{pri}$ set to 20.
Figure 15:
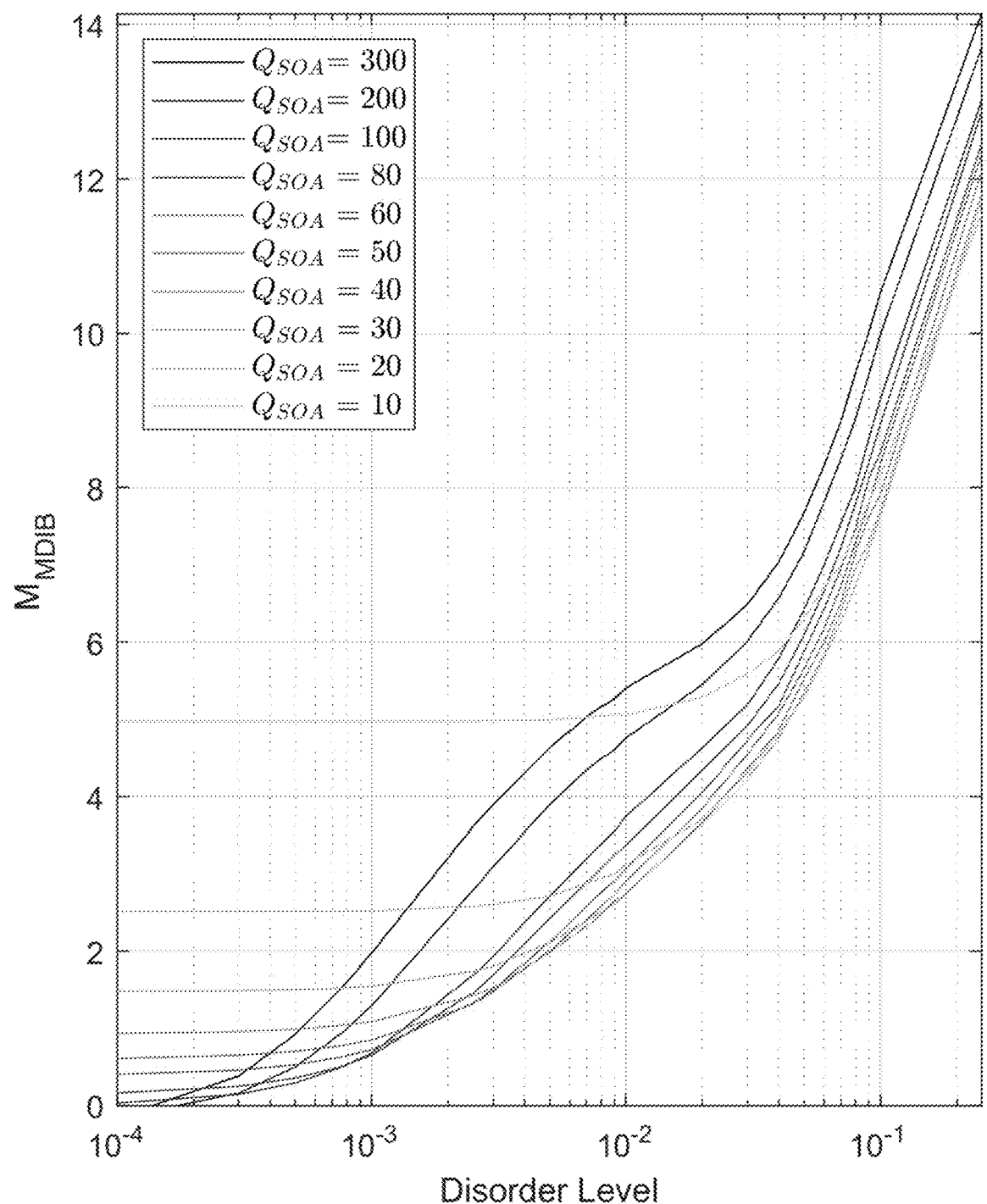
FIG. 15 is a graphical representation showing $M_{MDIB}$ of several values of $Q_{SOA}$ with $Q_{pri}$ set to 100.

FIGS. 14 and 15 depict $M_{MDIB}$ instead of $M_{RMS}$. The $M_{MDIB}$ metric records the highest difference throughout the reference and disorder curves instead of the root-mean-square. This behavior means that the scale of $M_{MDIB}$ will be higher than $M_{RMS}$ in all situations, but the trends will be similar. Using this metric, the scale will also change with the damping of the primary. This is because as disorder increases towards d=1, the SOA response trends towards that of the SDOF response with a mass addition. High levels of disorder destroy the ordered distributions, and a fully randomized frequency distribution reduces the SOA to nothing but a mass addition. Higher Q in the primary system increases the potential difference between any two frequency points, hence the increased scaling of the $M_{MDIB}$ metric.

Increased damping in the primary system reduces the scaling factor of $M_{MDIB}$ but the shapes of the curves remain constant. This effect does not occur in $M_{RMS}$ as the statistical nature of averaging random samples keeps the range the same. Note that the $M_{MDIB}$ curves after $10^{-1}$ do not align as they do with $M_{RMS}$. The lack of alignment is due to the nature of using a maximum value as opposed to the averaging done in a root-mean-square. Note that this is a statistically randomized sample that does not necessarily represent systematic manufacturing error and, as stated before, metric choice must be carefully considered which metric to use in designing an SOA for a specific application.

Figure 16:
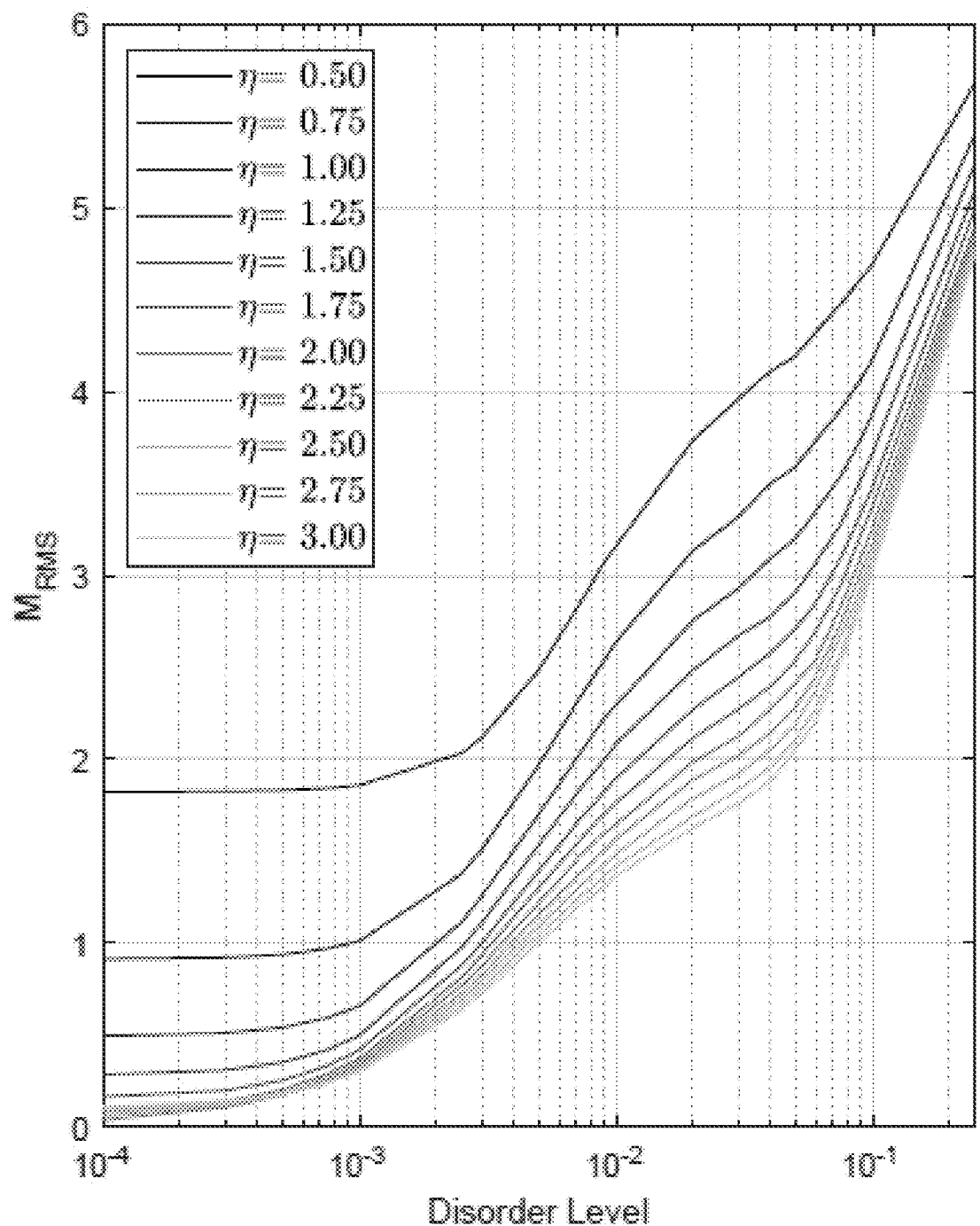
FIG. 16 is a graphical representation of an RMS metric showing η as a function of random disorder averaged. Note that even at very low disorder, η<2 has base levels of error sensitivity. The parameter η>2 has some advantage in the transition region. By 10%, the levels of $M_{RMS}$ begin to line up.
Figure 17:
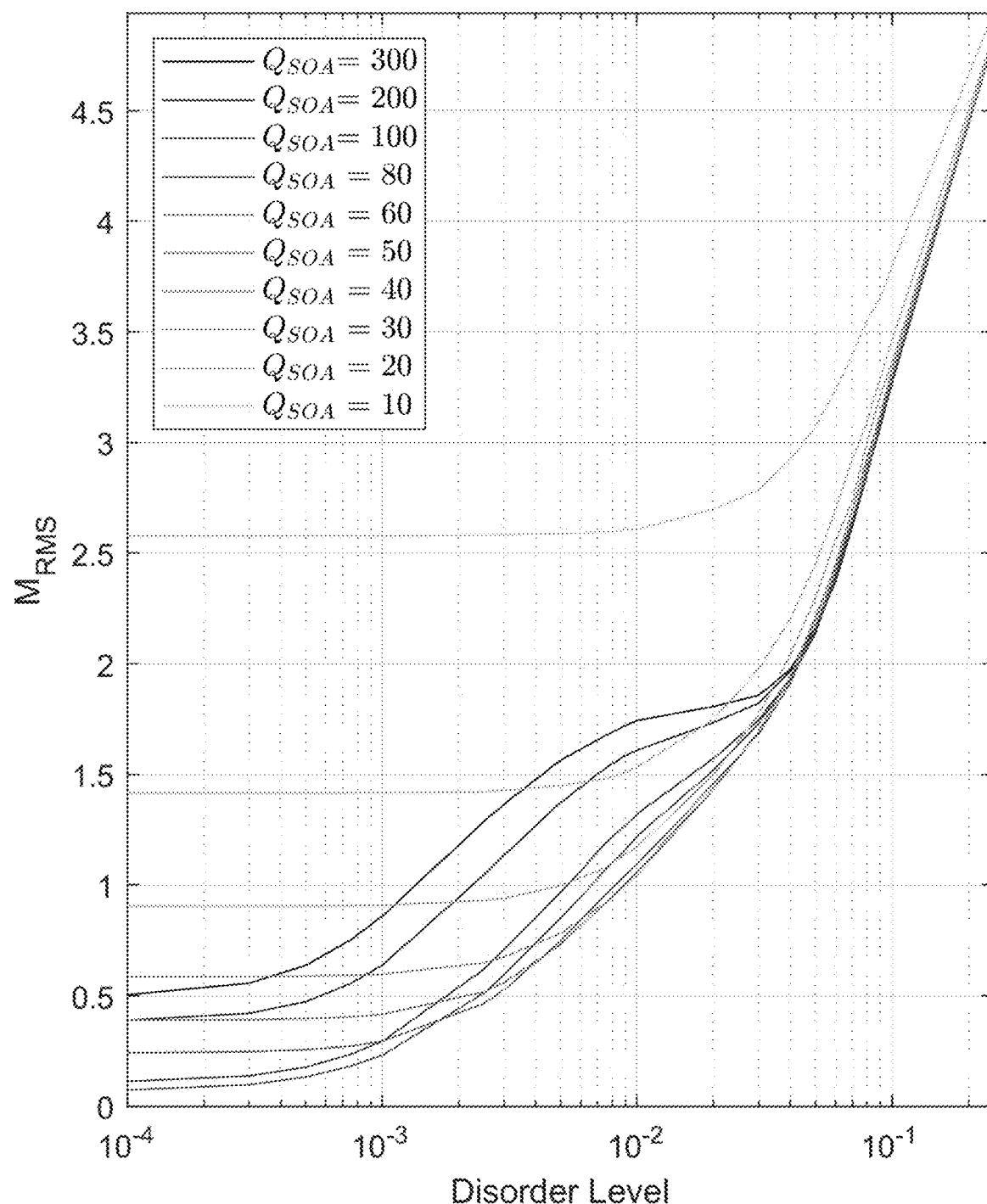
FIG. 17 is a graphical representation showing effects of increased modal overlap on the $M_{RMS}$ response to various damping levels.

FIG. 16 shows an example of the effect of increasing disorder at different levels of modal overlap. In earlier research, modal overlap had been set to 2 and no higher because disorder had not been considered. Looking at the figure, it is easy to see why. In the low-disorder zone, there is almost no effect of $\eta>2$. However, as this plot progresses into the disorder transition zone, the ability of increased modal overlap to mitigate the effects of disorder is clear.

In order to demonstrate the effect of increased modal overlap, FIG. 13 is replotted, but increasing $\eta$ from 2 to 3. Shown in FIG. 17, the $M_{RMS}$ levels in the disorder transition zone decrease significantly in comparison to FIG. 13. It should be noted that increasing η to 3 will add 50% more oscillators and may lead to unintended manufacturing issues.

As the design and manufacture of a mechanical SOA is attempted according to the present invention, one must carefully consider the properties of the primary system that is to be damped. Specifically, the mass and frequency bandwidth of the target system must be determined accurately. That frequency band is defined on two parameters, viz., center frequency, $F_C$, and fractional bandwidth, $\Delta$.

Additionally, the material from which the SOA is constructed is also important. The material stiffness and density must be known accurately. The first bending frequency for a beam with uniform rectangular cross-section is $$F_n = 1.875^2 \frac{1}{2\pi} \sqrt{\frac{Et^2}{12\rho L^4}} \tag{7}$$

where E is the material stiffness, t is thickness, ρ is material density, and L is beam length. Equation (7) can be rearranged to have length on the left. Then, realizing $\beta(n)F_C$ is equivalent to $F_n$, it can be substituted to arrive at Equation (8).

$$L(n) = \frac{1}{2\pi} \sqrt[4]{\frac{Et^2}{12\rho}\left(\frac{1.875^2}{\beta(n)F_c}\right)} \tag{8}$$

As previously noted herein, the optimum mass ratio for the flat-band response, μ, is equal to $\Delta^2/4$. The mass of each oscillator is calculated knowing the total SOA mass and distributing it across the array. For this system, the mass ratio distribution will have a negative linear distribution parameter, optimized to be −1. The lowest frequency element will be the most massive one and the highest frequency will be the least massive. The mass distribution, α, is defined by t h e equation $$\alpha(n) = -\left(\frac{\mu}{N}\right)\alpha^*(n) \tag{9}$$

where α represents the distributions of the masses of each oscillator, N is the total number of oscillators and α* is a linear distribution $$\text{from } 1 - \frac{\Delta}{2} \text{ to } 1 + \frac{\Delta}{2}$$

with N* elements. Linear distribution α* is similar to p in its limits, but is not given in the SOA parameters because it is not changed or varied. For simple systems where the mass of the primary system is just the mass of the beam used to create the center frequency, the respective masses of the oscillators are small.

Now knowing the mass of each element, it is simple to calculate the width using the length of the corresponding element given a thickness. A constant thickness is therefore iterated in order to bring the length and width into acceptable ranges given the density and volume relationships. Knowing that m=μLWt, one can define the width distribution as $$W(n) = \frac{\alpha(n)}{\rho L(n) t_i}. \tag{10}$$

As thickness is iterated, the length and width distributions are automatically adjusted through previously discussed relationships to keep a constant α(n). As such, there are an infinite amount of solutions to the SOA design problem. However, each solution is checked against the previously discussed material limits, which again, may vary depending on material and manufacturing method.

Figure 18:
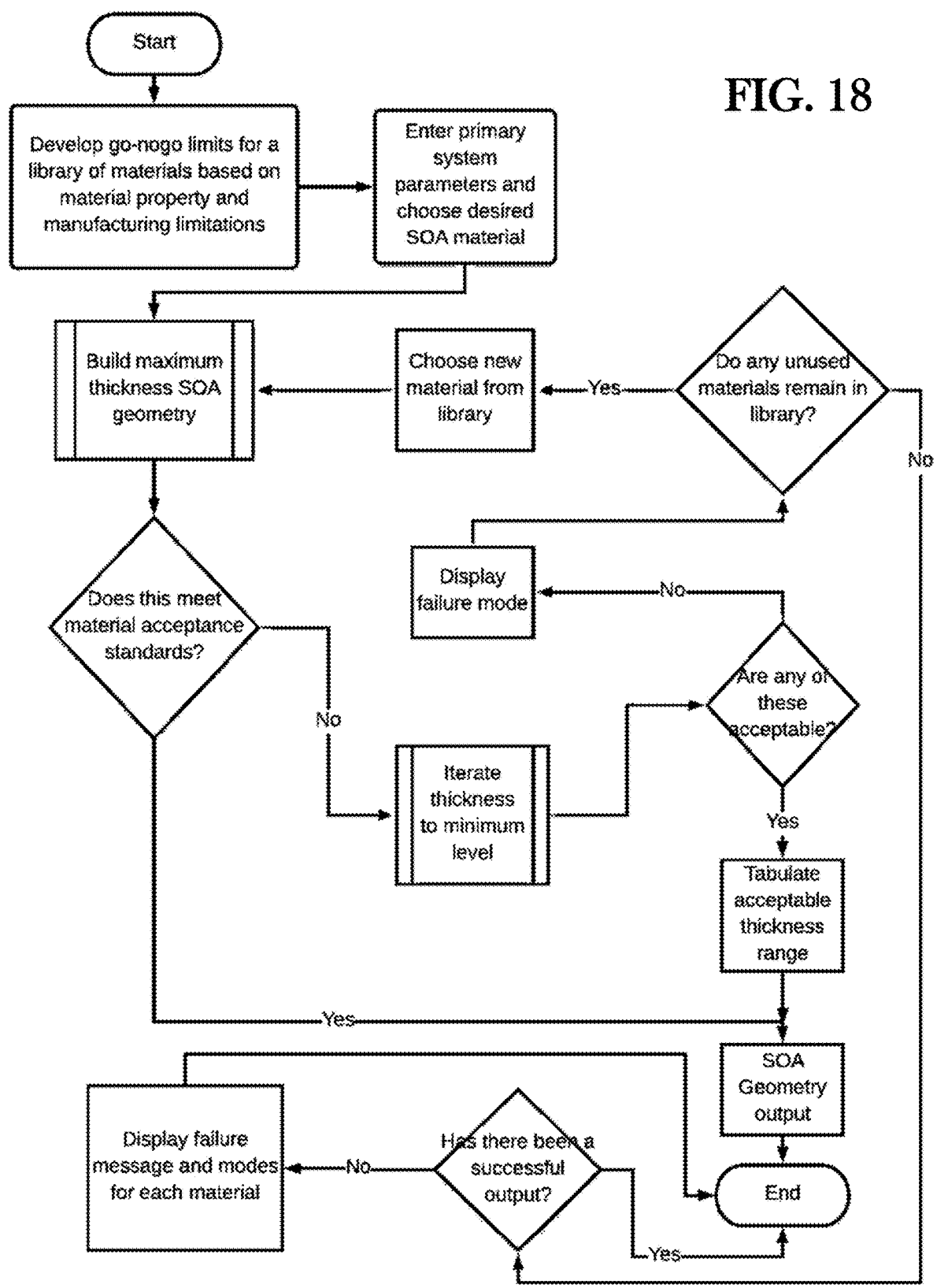
FIG. 18 is a flow diagram illustrating an example of geometric design of a subordinate oscillator array (SOA), in accordance with the present invention.

A flowchart for an example of a design algorithm in accordance with the present invention is shown in FIG. 18. The geometry building algorithm requires all of the variables defined earlier in this section as well as the mass of the primary. It also uses information that must be gathered in a library of material properties and determined manufacturing limitations. These limitations are different for each material and not all of them are applicable to every material. Note that more established materials and manufacturing methods (such as water-jetted steel) will not have nearly the same limitations as the constantly evolving 3D-printed materials and methods. However, the established materials will be more expensive and have longer lead times. The minimum geometric design criteria, including manufacturing constraints discussed hereinabove, should be addressed regardless of whether they are dismissed later.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A method for making a device suitable for attenuating vibration of a structure, the method comprising configuring a subordinate oscillator array having a plurality of oscillator elements, said configuring including designating a number of said oscillator elements, attributing each said oscillator element with an element mass and an element stiffness, and distributing said oscillator elements, wherein a coupling of said subordinate oscillator array with a structure results in a vibratory attenuation of said structure, said vibratory attenuation characterized by an at least substantially flat vibratory frequency across a selected vibratory frequency band of said structure, wherein said designating of said number of said oscillator elements is based on the equation $N=\eta Q \Delta$ where N is the number of said oscillator elements, η is the modal overlap, Q is the quality factor of said oscillator elements, and Δ is the fractional bandwidth.

2. The method for making a device as recited in claim 1, wherein said configuring further includes attributing each said oscillator element with an element length, an element width, and an element height.

3. The method for making a device as recited in claim 1, wherein said configuring further includes attributing each said oscillator element with a said element quality factor, wherein said element quality factor characterizes a physical damping in said oscillator element.

4. A method for attenuating vibration of a structure, the method comprising:
- configuring a subordinate oscillator array having a plurality of oscillator elements, said configuring including designating a number of said oscillator elements, attributing each said oscillator element with an element mass and an element stiffness, and distributing said oscillator elements;
- attaching said subordinate oscillator array to a structure so that the attached said subordinate oscillator array effects a vibratory attenuation of said structure, said vibratory attenuation characterized by an at least substantially flat vibratory frequency across a selected vibratory frequency band of said structure;
- wherein said designating of said number of said oscillator elements is based on the equation $$N = \eta Q \Delta$$

where N is the number of said oscillator elements, $\eta$ is the modal overlap, Q is the quality factor of said oscillator elements, and $\Delta$ is the fractional bandwidth.

5. The method for attenuating vibration as recited in claim 4, wherein said configuring further includes attributing each said oscillator element with an element geometry.

6. The method for attenuating vibration as recited in claim 5, wherein said element geometry is defined by an element length, an element width, and an element height.

7. The method for attenuating vibration as recited in claim 6, wherein said configuring further includes attributing each said oscillator element with a said element quality factor, wherein said element quality factor is associated with physical damping in said oscillator element.

8. The method for attenuating vibration as recited in claim 7, the method further comprising reconfiguring the attached said subordinate oscillator array, said reconfiguring including changing at least one of:
- said number of said oscillator elements;
- said element mass of at least one said oscillator element;
- said element stiffness of at least one said oscillator element;
- said geometry of at least one said oscillator element;
- said element quality factor of at least one said oscillator element.

9. The method for attenuating vibration as recited in claim 4, wherein said configuring further includes attributing each said oscillator element with an element geometry.

10. The method for attenuating vibration as recited in claim 4, wherein said element geometry is defined by an element length, an element width, and an element height.

11. The method for attenuating vibration as recited in claim 4, wherein said configuring further includes attributing each said oscillator element with a said element quality factor, wherein said element quality factor is associated with physical damping in said oscillator element.

* * * * *

UNITED STATES PATENT AND TRADEMARK OFFICE
CERTIFICATE OF CORRECTION

PATENT NO. : 11,512,756 B1
APPLICATION NO. : 17/126709
DATED : November 29, 2022
INVENTOR(S) : John A. Sterling and Joseph F. Vignola It is certified that error appears in the above-identified patent and that said Letters Patent is hereby corrected as shown below:

On the Title Page

Item (54) and in the Specification Column 1, Lines 1-2, please change the title from "MANUFACTURE METHODS RELATING TO A SUBORDINATE OSCILLATOR ARRAY" to "DESIGN AND MANUFACTURE METHODS RELATING TO A SUBORDINATE OSCILLATOR ARRAY"

Signed and Sealed this
Eighteenth Day of April, 2023

Katherine Kelly Vidal
*Director of the United States Patent and Trademark Office*